United States Patent
Gudjonsson et al.

(10) Patent No.: US 6,564,261 B1
(45) Date of Patent: May 13, 2003

(54) DISTRIBUTED SYSTEM TO INTELLIGENTLY ESTABLISH SESSIONS BETWEEN ANONYMOUS USERS OVER VARIOUS NETWORKS

(75) Inventors: Gudjon M. Gudjonsson, Reykjavik (IS); Kjartan Pierre Emilsson, Reykjavik (IS)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/567,157

(22) Filed: May 9, 2000

Related U.S. Application Data

(60) Provisional application No. 60/133,401, filed on May 10, 1999.

(51) Int. Cl.⁷ .............................................. G06F 15/16
(52) U.S. Cl. ........................ 709/227; 370/261; 379/900
(58) Field of Search ................................ 709/204–206; 707/104.1; 379/900; 370/260–261

(56) References Cited

U.S. PATENT DOCUMENTS

| | | | |
|---|---|---|---|
| 5,544,322 A | | 8/1996 | Cheng et al. |
| 5,748,736 A | | 5/1998 | Mittra |
| 5,884,322 A | | 3/1999 | Sidhu et al. |
| 5,898,839 A | | 4/1999 | Berteau |
| 5,918,017 A | | 6/1999 | Attanasio et al. |
| 5,928,325 A | * | 7/1999 | Shaughnessy et al. ...... 709/206 |
| 5,949,872 A | | 9/1999 | Khalil et al. |
| 5,958,014 A | | 9/1999 | Cave |
| 6,055,574 A | | 4/2000 | Smorodinsky et al. |
| 6,247,057 B1 | * | 6/2001 | Barrera, III ................. 709/229 |
| 6,260,148 B1 | * | 7/2001 | Aggarwal et al. .......... 713/201 |

(List continued on next page.)

FOREIGN PATENT DOCUMENTS

| | | |
|---|---|---|
| EP | 0 478 485 A2 | 4/1992 |
| EP | 0 865 180 A2 | 9/1998 |
| EP | 0 984 608 A2 | 3/2000 |

OTHER PUBLICATIONS

Hui, S., et al., A Dynamic IP Addressing System for Internet Telephony Applications, Computer Communications, vol. 21, No. 3, pp. 254–266, Mar. 1998.*

(List continued on next page.)

*Primary Examiner*—Zarni Maung
*Assistant Examiner*—Andrew Caldwell
(74) *Attorney, Agent, or Firm*—Nixon & Vanderhye P.C.

(57) ABSTRACT

A network provides users with a simple and secure way of establishing communication sessions with other users or services, running either over IP networks or other networks, e.g., PSTN. In a sense, the network can broker communication services between two or more users (e.g., people) and/or services. A plurality of different clusters of servers is provided, and each of the clusters may be linked together. In certain embodiments, each cluster includes multiple servers. Users are registered within some specific cluster and given a unique system/network ID. In certain embodiments, messages are not sent directly between users, but instead through at least one intermediate routing service (RS) provided on a server of one of the users. Thus, in certain embodiments, a user may hide or mask his/her personal information from other users even when communicating with them. In certain embodiments, a user may establish a communication session with another user without knowledge of the client device (e.g., PC, mobile phone, etc.) being used by the other user; as the network arranges for communication (e.g., text chat session, voice chat session (PC to PC, PC to PSTN, or PC to mobile phone), web conference, or pages (PC to PC, PC to SMS)) between the users regardless of the client device being used by the called user. Thus, the network enables any of the above communication services between users, and the initiating user need not know whether the other user is currently online via his/her PC or may instead be reached via pager or mobile phone.

20 Claims, 17 Drawing Sheets

U.S. PATENT DOCUMENTS

| | | | |
|---|---|---|---|
| 6,301,609 B1 * | 10/2001 | Aravamudan et al. | 707/1 |
| 6,332,081 B1 * | 12/2001 | Do | 455/461 |
| 6,351,464 B1 * | 2/2002 | Galvin et al. | 370/356 |
| 6,366,962 B1 * | 4/2002 | Teibel | 709/203 |
| 6,415,318 B1 * | 7/2002 | Aggarwal et al. | 709/206 |
| 6,421,437 B1 * | 7/2002 | Slutsman | 379/201.02 |
| 6,421,674 B1 * | 7/2002 | Yoakum et al. | 707/10 |
| 6,446,127 B1 * | 9/2002 | Schuster et al. | 709/227 |
| 6,466,969 B1 * | 10/2002 | Bunney et al. | 709/206 |
| 6,493,324 B1 * | 12/2002 | Truetken | 370/261 |
| 2002/0032736 A1 * | 3/2002 | Idehara | 709/206 |

OTHER PUBLICATIONS

"Using Hyperflow for Secure Internet Server Clusters" Cyber IQ Systems, Dec. 1998, pp. 1–16.

"SIP: Sessions Initiation Protocol", Handley et al, Mar. 1999, RFC 2543 (153 pages printed).

"Instant Messaging/Presence Protocol Requirements", Day et al, Feb. 2000, RFC 2779 (26 pages).

"SDP: Session Description Protocol", Handley et al, Apr. 1998, RFC 2327 (42 pages printed).

"A Model for Presence and Instant Messaging", Day et al, Feb. 2000, RFC 2778 (17pages printed).

"Intelligent Network (IN) Tutorial, Introduction of IN", Aug. 1999 (2 pages).

"Mobile IP Telephony: Mobility Support of SIP", Moh et al. pp. 554–559, XP–002143545, IEEE, Oct. 1999.

* cited by examiner

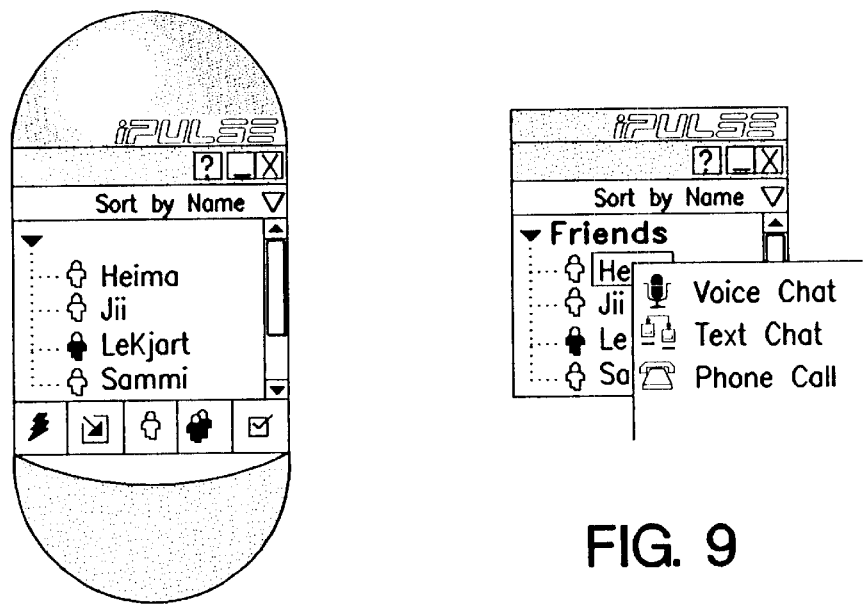
FIG. 8
FIG. 9
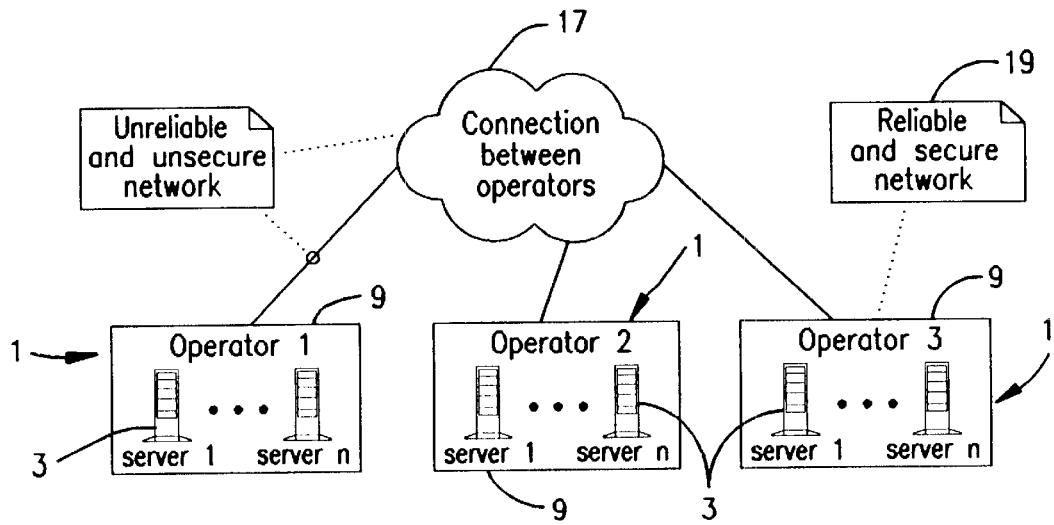
FIG. 10

| ACTION | RESPONSIBLE SERVER |
|---|---|
| Retrieve contact list and blinded list | US |
| Add/remove contact in contact list | US |
| Add/remove blinded user in blinded list | US |
| Invert blinded list | US |

DISTRIBUTED SYSTEM TO INTELLIGENTLY ESTABLISH SESSIONS BETWEEN ANONYMOUS USERS OVER VARIOUS NETWORKS

This is a continuation of U.S. Provisional Patent Application Ser. No. 60/133,401, filed May 10, 1999, the disclosure of which is hereby incorporated herein by reference and on which priority is hereby claimed.

FIELD OF THE INVENTION

This invention is related to a system and corresponding method of establishing communication session(s) between users as a function of their availability and/or communication device(s).

BACKGROUND OF THE INVENTION

Typically, users of communication tools (e.g., mobile phone, PCs, email, etc.) are faced with two essential tasks: locating the device address of other users to communicate with, and establishing a communication session with that device. These tasks typically differ depending upon what device the user(s) is/are using. For example, on a mobile phone with messaging capabilities, users usually locate other users by finding them in their local address book, and then establish either a voice session with that user by dialing a phone the user's phone number, or they may type in a short text message (STM) and send that to the other user, either to their mobile phone or their email. Depending on the phone operator of the callee, he/she may or may not be able to receive these calls.

As another example, a user of a PC based text-chat software may have a list of other users that they can initiate a chat session with. However, they will only be able to do so when the other person is logged on. When logged off, they have no way of determining how to reach that person, nor can that person be made aware that someone is trying to reach them.

Thus, problems to be solved may include any or all of the following. How to make contact information available and configurable centrally, independent of devices, and give users a single address to use for all communications. How to advertise the availability of a user to participate in some kind of communication session. How to initiate a communication session with another user (i.e., a contact) independently of devices and thus without knowing any device addresses of the contact in question. How to enable users to centrally control how calls intended for them should be handled with or without their direct intervention. How to insure interoperability of these functions, when the callers and callees devices are on distinct networks, possible operated by different service providers. How to keep other users from changing a user's contact information or routing settings or in any other way impersonate another person. How to allow a user to block annoying people from contacting him/her in a central location. How to enable more than one organization/company/operator to provide services described herein in an efficient and/or interoperable way.

The SS7 system allows intelligence in routing decisions made when setting up a phone call (e.g., see Intelligent Network (IN) architecture originated by Bell Communications Research), in which the service logic for a call is located separately from the switching facilities, allowing services to be added or changed without having to redesign switching equipment. A later version of IN called Advanced Intelligent Network (AIN) introduced the idea of a service independent architecture in which a given part of a telephone number can be interpreted differently by different services depending on factors such as time of day, caller identity, and type of call. AIN makes it easy to add new services without having to install new phone equipment.

Unified messaging systems allow users to provide essentially one address for a variety of communication options, typically including phone calls, voice mailbox, fax, and e-mails. Typically, all messages are stored in one centralized inbox, that the user can access from different devices, sometimes using media translations (e.g., converting text messages to voice). This effectively reduces the number of device addresses that a user needs to give out. There are numerous companies working with unified messaging products.

Various companies have created networks running on top of the Internet that allow users to send each other short text messages and monitor the status of other users, where the status is usually defined as whether a user is currently connected to the network or not. This kind of functionality is currently being considered as an IETF standard called IMPP (Instant Messaging and Presence Protocol).

The Session Initiation Protocol (SIP) is in the process of becoming an IETF standard, and has been positioned as the successor of SS7 in IP based networks. The protocol basically allows users to invite other users to arbitrary communication sessions over the Internet, and at the same time allows for arbitrary routing of these invitations.

The aforesaid IN and AIN approaches used in SS7 are limited to the phone network and are not easily extendable to other networks like the Internet. Thus, there is no easy way to advertise availability of other users to communicate. There also is no easy way for users to configure their routing, except through limited interfaces. Instant messaging systems are typically only IP based, and do not in general allow communication across different networks. Most such systems rely on users to be connected to the system in order for their routing to be active and they disclose network addresses to other users, which potentially can be considered a security breech. Furthermore, most systems rely on a centralized architecture which may make it difficult to distribute a user database and traffic among many providers.

In general, various systems address a portion of the problems discussed above. However, there exists a need in the art for a system/network and corresponding method for handling one or more of the aforesaid problems in a more comprehensive manner.

SUMMARY OF THE INVENTION

A system includes a loosely confederated network of server clusters along with any number of client terminals (i.e., clients) that connect to the clusters. Terminals/clients can be software entities running under some operating system or any other device running on some communication network that can have access to the cluster. Users are registered within some specific cluster and given a unique user ID. This user ID along with the ID of the cluster (CID) constitutes a globally unique user ID (UID) within the whole system. Users can be human or any other entity that connects to the cluster via some client terminal or by some other method/system. Terminals can gain access to any number of services running within the cluster, or to services running in other clusters (a "service" is a software entity that can have arbitrary functions). The connection between the terminal and the cluster is secure, and may use cryptography in certain embodiments.

Basic services which may be provided within each cluster, include, for example: 1) dynamic user properties, called online status or user's "presence", that allows users and clients to centrally define and modify data points linked to them; these changes can either be manual (explicitly made by the user) or automatic (by some client or server side logic); 2) contact list and contact notification, that allow users to subscribe and be notified of the online status of other users, and/or be notified of change of other user's presence information; and 3) routing service, that allows users to send requests (i.e., invitations) for communication sessions to other users, as well as configure how these invitations are handled depending on the user's current presence information.

The routing service allows users to send invitations to other users to establish an arbitrary communication session (e.g., text chat session, voice chat session, web conference, etc.) over arbitrary networks. The requests are not sent directly between users. Instead, the routing service for the sending/inviting user sends the invitation to the routing service for the receiving user. The routing service for the receiving user determines, according to a logic specified by the same receiving user, how the request is handled and what services are available to handle the request. For example, the routing service for the receiving user may forward the invitation to the receiving user's client, may ignore the invitation, may forward the invitation to the receiving user's mobile phone, or may forward the invitation to the receiving user's inbox so that the user may later read the invitation.

The cluster and services within it make the necessary minimum setup for the session to be established, and thus no network addresses need to be exchanged between the users, thus retaining the anonymity of the users. As users can be software entities as well as persons, the system allows communication sessions between users and arbitrary data services. In certain embodiments, the system does not need a central database of all users to function, but clusters can forward requests to other clusters, and thus insure the connectivity of all clusters within the system.

The application provides users with a buddy list (i.e., contact list). A user can add other users to this list and organize them into groups. Using the application, the user can be aware of the online status of users in his/her buddy list (i.e., contact list), and get notification when these users' status(es) changes. Moreover, a user can set his/her own online status, make himself/herself invisible to annoying users, and send users in his/her buddy list any kind of message with a simple double click.

In certain embodiments, messages are not sent directly between users, but instead through at least one intermediate routing service (RS) provided on a server of one of the users. Thus, in certain embodiments, a user may hide or mask his/her personal information from other users even when communicating with them. In certain embodiments, a user may establish a communication session with another user without knowledge of the client device (e.g., PC, mobile phone, etc.) being used by the other user; as the network arranges for communication (e.g., text chat session, voice chat session (PC to PC, PC to PSTN, or PC to mobile phone), web conference, or pages (PC to PC, PC to SMS)) between the users regardless of the client device being used by the called user. Thus, the network enables any of the above communication services between users, and the initiating user need not know whether the other user is currently online via his/her PC or may instead be reached via pager or mobile phone.

BRIEF DESCRIPTION OF THE FIGURES

FIG. 8 illustrates an exemplary contact list of a user as it appears on the user's terminal/client's display screen according to an embodiment of this invention.

FIG. 9 illustrates a menu list of a plurality of different types of invitation messages which a user may choose from to send to another user, this figure illustrating how the menu list appears on the user's terminal/client's display screen according to an embodiment of this invention.

FIG. 10 is a functional diagram illustrating how each operator may run one or more clusters according to an embodiment of this invention, where each of the clusters can communicate with one another so that invitations/messages/data can be sent from a user on one cluster to a user(s) on another cluster.

DETAILED DESCRIPTION OF CERTAIN EXEMPLARY EMBODIMENTS OF THIS INVENTION

Figure 1:
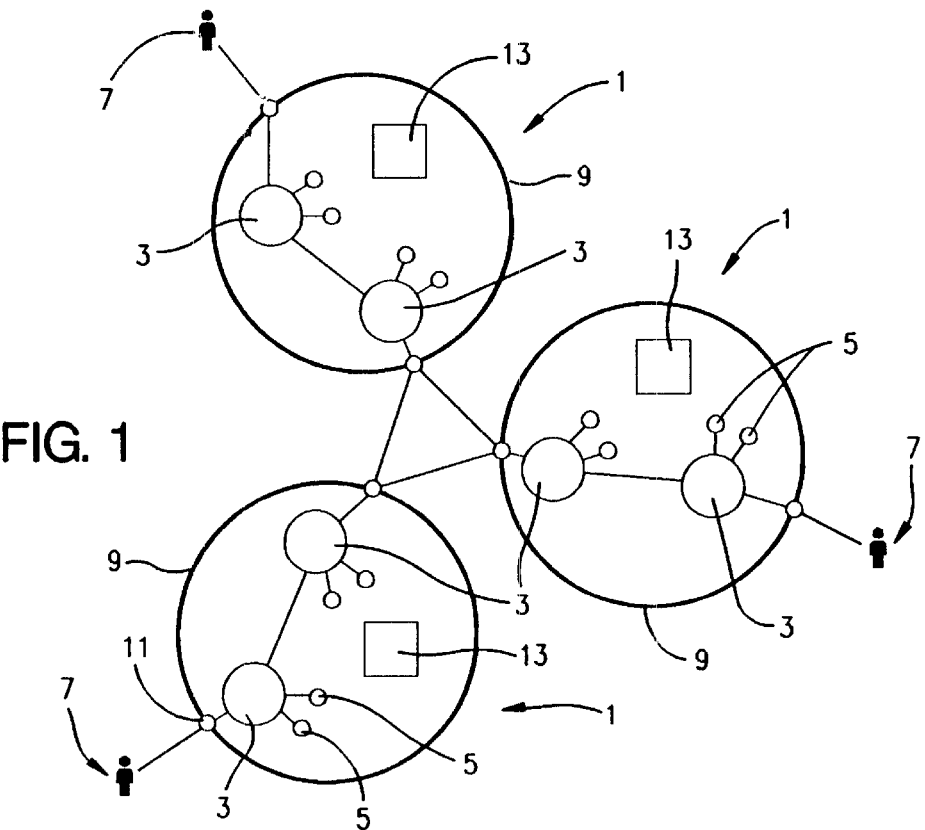
FIG. 1 is a schematic diagram of a plurality of server clusters connected together according to an embodiment of this invention.

In the following description, for purposes of explanation and not limitation, specific details are set forth such as particular embodiment, network architectures, signaling flows, protocols, techniques, etc. in order to provide an understanding of the present invention. However, it would be apparent to those skilled in the art that the present invention may be practiced in other embodiments that depart from these specific details. In certain instances, detailed descriptions of well-known methods, interfaces, devices, protocols, and signaling techniques are omitted so as to not obscure the description of the present invention with unnecessary detail.

Initially, it is noted that the notations in software design diagrams comply with the UML standard (Unified Modeling Language) in most cases. The same notation is used for data diagrams as is used for class diagrams. The reader should therefore note whether data structures or conventional classes are being described. In high-level sequence diagrams, half-arrowheads are used for messages with no reply. Whole-arrowheads are used for a request-reply message pair in those cases where the exact details of the back-and-forth communications are not important.

Familiarity with the drawings and certain terms is helpful in the context of the instant application. Thus, set forth below are a plurality of definitions that apply to this application and the patent to result therefrom.

DEFINITIONS/GLOSSARY OF CERTAIN TERMS USED HEREIN

"Community." a set of users with which a user can interact through his/her application. There may be many different communities or there may be a single global community. This is defined by how servers are grouped together and to which servers users connect.

"Application." This refers to the entire system/network of this invention; including the client-side software, the server-side software, the data stored, and the functionality of this system as a whole.

"Client." The software used to access the application from the client or user side.

"Back-end." The set of servers, networks, and software to which a given client is connected, directly or indirectly (i.e. its local cluster, plus any clusters the local cluster is connected to).

"Cluster." A collection of servers plus a database, connected with a high-speed, reliable, secure network. The back-end is a set of interconnected clusters.

"Local cluster." The cluster which a given client is directly connected to.

"User." An entity, human or software, that accesses the application through a client.

"Framework." The application framework that is common to back-end servers.

"Service." A service is a software entity which resides on, e.g., a server and provides a set of functions to clients of the server. The set of functions it provides is specified by a protocol description, which defines in a non-ambiguous way how to use the service.

"Service creator." A programmer that writes a service.

"Client implementor." A term used for programmers that create clients to the back-end system.

"Message." A piece of information sent from one user to another.

"Control message." A piece of information sent from a client to a server or from a server to a client or between servers. Control messages are used to access the functionality of other components of the system.

"Request." A control message initiated by a client and sent to a server.

"Reply." A control message sent from a server to a client in reply to a request.

"Notification." A control message initiated by a server and sent to a client.

"Response." A control message sent from a client to a server in response to a notification.

"Mode of communication." The method used for real-time communication, e.g., voice, herein.

"Conversation." A dialogue between two or more users carried out in real time.

A "message type" is the type of information sent in a message, e.g., a short text message.

"CS." Connection Server. This can refer to the server software and/or the machine running it. Which is being referred to should be obvious from context.

"DB." Relational database, preferably including the machine running it.

"UMF." User mapping function. This is conceptually a single entity but is actually implemented on each CS, US and ICS, and thus may be multiple entities. UMF is preferably stored in the DB, although it may be otherwise stored in other embodiments.

"GRID." Group identifier for contacts in contact list.

"CID." Cluster identifier

"ICS." Intra-Cluster Server. Can refer to the server software and/or the machine running it. Which is being referred to should be obvious from context.

"ICSID." Intra-Cluster Server identifier

"UID." User identifier

"US." User Server. Can refer to the server software and/or the machine running it. Which is being referred to should be obvious from context.

"USID." User server identifier.

"Message repository." An entity which can receive messages of one or more types on behalf of a user and store them at least until the user retrieves them, e.g., a fax machine.

"Device." An entity which can function as one or more conversation endpoints or as a message repository for one or more message types or as both. Also, a device may be able to send messages of one or more types. An example of this is a GSM phone, which is a short text message repository, and a conversation endpoint for voice conversations.

"Profile." A set of routes where each route is enabled for a user or a group of users as defined in the buddy/contact list. A profile is complete in the sense that for every user there is a route for every mode of communication.

DESCRIPTION OF EXEMPLARY EMBODIMENTS OF THE INVENTION

A system/network according to certain embodiments of this invention includes a plurality of client applications (e.g., Win32 operable by respective users) and a back-end server system having a plurality of clusters (e.g., running on Windows NT). A main function is to provide users with a simple and secure way of establishing arbitrary communication sessions with other users or services, running either over IP networks or other networks, e.g., PSTN. It also provides operators (an operator is one who operates or manages at least one cluster) a comprehensive environment in which to deploy value added services (e.g., search engine services, database services, shopping services, services for sending users stock information such as stock prices, video conferencing services which enable user(s) to set up a video conference via a video conferencing server that is external to the application, etc.) to their users and to be able to charge for their use, as well as providing them a way to link their installed base of services over to IP networks. In basic terms, aspects of the system/network act as a broker(s), and can broker communication services between two or more people (or their respective clients/PCs/phones), as well as broker access to value added services, some communications based—others not. Access to the services is provided either by lightweight clients, running on various operating platforms or through gateways for browser based systems, such as WAP (Wireless Application Protocol). The system/network is designed to enable easy building and operation of Value Added Services (VAS), using the user management functions, security, authentication and charging features of the system/network as their base. Since the system/network is designed to offer accessibility and mobility, a user will be able to access his or her data and services from virtually any communication device—computer, mobile phone, handheld devices etc. ensuring a broad reach for Value-Added Services of the system/network.

Figure 2:
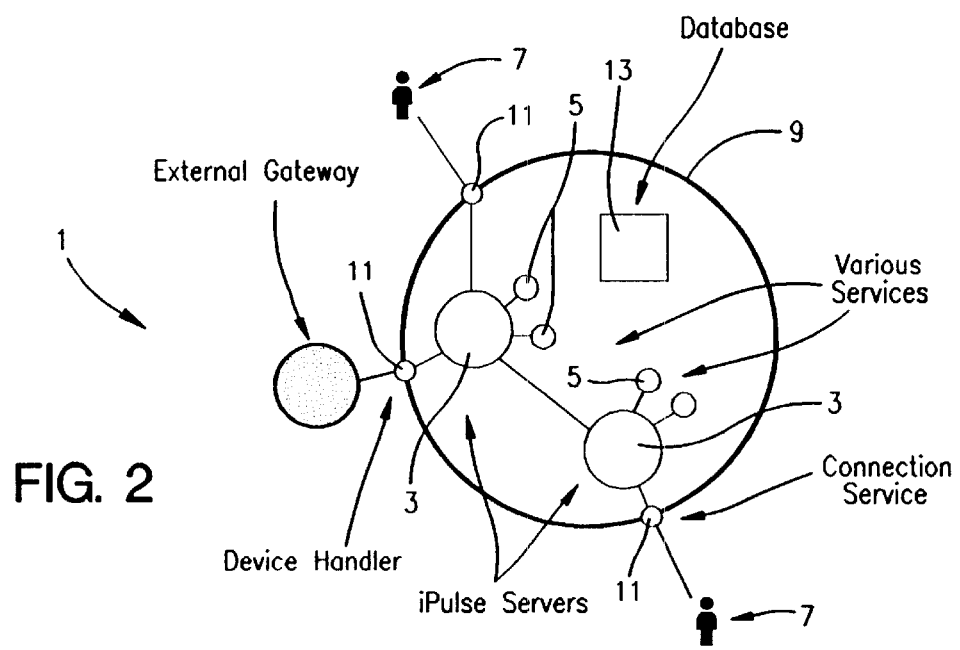
FIG. 2 is a schematic diagram of an exemplary one of the clusters of FIG. 1 according to an embodiment of this invention.

FIG. 1 illustrates a plurality of clusters 1 of the system/network which may communicate with one another, while FIG. 2 illustrates an exemplary cluster 1 of the FIG. 1 embodiment. Referring to FIG. 2, a basic installation of the system/network includes a number of interconnected servers 3, each of them running a number of services 5. Such a collection of servers is called a cluster 1 as shown in FIG. 2. A cluster 1 defines an address space for services 5, and provides the low-level connectivity for services to connect to each other, as well as for connections with external servers. Each service can provide access to its functionality through some well known protocol(s), which are again built on top of a generic stream model. Thus a service can request another service by name, and establish a connection with it using a service specific protocol.

External users 7 and their respective clients 11 (e.g., a user's PC, mobile phone, and/or PDA) can connect to services within the cluster via a special connection service, that typically runs on server(s) (connection servers) at the boundary of the cluster's firewall 9, and listens for connections on a specific port. Streams established through that service are secure and encrypted in certain embodiments, e.g., using the SSH 2.0 protocol in the case of a Win32 client. As such, the cluster 1 along with all connected users 7 and clients 11 can form a virtual private network within which connections between services can be freely established. Connections can also be made between services and/or users 7 in different clusters 1, as illustrated in FIG. 1. Such connections go through a special inter-cluster service, which can limit what services are actually available. Connections between clusters may also be secure and encrypted in preferred embodiments of this invention.

Additional servers and software that fall outside of this architecture may also form an integral part of an installation (s). As such they are considered part of the cluster, examples being a robust database(s) 13 (e.g., Oracle 8) and various operation and maintenance tools with which servers 3, users 7 and/or clients 11 may communicate.

Typically, certain servers 3 are set up with a given configuration of services, and these might sometimes referred by some given name, e.g., servers that run the connection service for external clients are called connection servers as discussed hereinbelow, though they do not differ architecturally from other servers.

In certain embodiments of this invention, by default a cluster 1 will run a basic set of services. In exemplary embodiments, this basic set of services may offer the following features: 1) allow each user (or user's client) 7 to have a unique identity within all clusters; 2) provide each user 7 the ability to connect and be securely authenticated by the cluster 1 using that identity; 3) provide each user 7 the ability to define arbitrary sets of data related to that identity (this data is persisted or stored in the database 13, and this data is referred to herein as "presence" data of the user); 4) provide each user 7 the ability to publish a dynamic status information and/or presence information related to their identity (in a simple case, this status or presence might be whether the user is currently online on his/her PC or not); 5) provide each user 7 the ability to monitor the status/presence of a given set of other users 7 (in the same or different cluster(s)), and be notified of any change thereof; and 6) provide each user 7 the ability to look for other user's identity(ies) using queries by name or other useful criteria.

Referring to FIGS. 3–6, a function of the system/network is to provide the possibility for users 7 to establish arbitrary communication sessions with other users 7. Different types (e.g., voice or text) of communication may be established in different embodiments. The system/network handles the initial discovery of the mutual communication channel using "invitations." "Invitations" may also be referred to as invitation messages or INVITE(s) herein, for purposes of simplicity.

An invitation is basically a request from one user 7 to another to join him/her in some given type of communication. The format of these may follow the IETF standard called SIP (Session Initiation Protocol), in certain embodiments. Typically, a client 11 will support some given set of communication types and will know how to create a SIP invitation for each type. When a user 7 wishes to establish a communication with another user, he/she will invoke some function within his/her client 11, requesting the client to send an invitation of a given type to some selected user. The user's client 11 will then form the correct SIP message and send it to a special service within the cluster, called the Routing Service (RS). In certain preferred embodiments, each user has a particular routing service provided on the user's user server (US).

In certain embodiments, the Routing Service (RS) is invoked in the context of the recipient of the message, but may or may not be invoked in the context of the sending user. A function of the RS is to decide what to do with the invitation message. As such, messages are never sent directly between users, but always from a user to another user's Routing Service (RS). The decision logic of the Routing Service is local to the user and thus may be programmed by the user 7 in accordance with the user's desires, and it can as complex as needed, though it will usually be limited by the necessity of users to be able to control it in some simple manner. Whatever the logic is, the Routing Service can end up doing two things: ignore the invitation or forward it to some other service that accepts invitations of the given communication type. Services that accept invitations are called device handlers. Clients 11 are exemplary types of device handlers in certain embodiments of this invention.

A device handler is a communication endpoints to which the routing service can dispatch invitations. Device handlers are specifically used to interface with other networks. For example, to dispatch text pages to the mobile cellular telecommunications network, a device handler is installed that accepts text pages, looks up the receiver's mobile number and then sends all the relevant information to some standard paging gateway, such as an SMS gateway. Alternatively, a device handler may enables phone calls. Currently two such device handlers are available: one that interfaces with the Ericsson IP Telephony system, thus making it possible for Voice Chat invitations to end up in the PSTN network. Another device allows the routing of text pages to the GSM network. All services and device handlers can access administrative information in the database, e.g., for checking user's accounts and permissions to use the specific service. This allows centralization of service billing in the database. Services can easily be created and deployed within the system using a service SDK. In this manner, support for routing to new networks or existing services can easily be added to the system.

Figure 3:
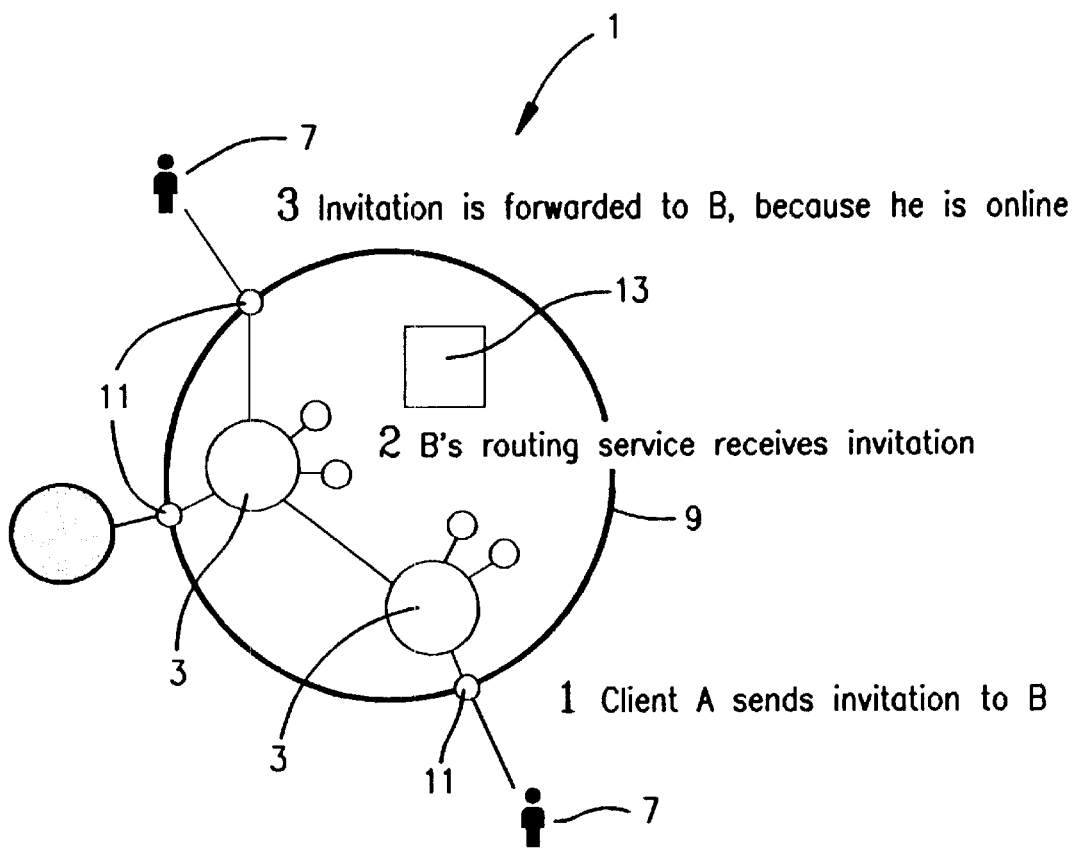
FIG. 3 is a functional diagram illustrating how a first user (having a client A, such as a PC) sends an invitation message to another user (having a client B, such as a PC) according to an embodiment of this invention, wherein client B's routing service forwards the invitation message to client B.

Referring to FIG. 3, a first user A (having a client A) desires to send an invitation message to user B (having client B). As an illustration of a device handler, a connected client 11 can present itself to user B's RS as being an eligible end point for invitations of certain types. For example, if user A sends an invitation for text chat to user B as in FIG. 3, and user B has his/her RS configured such that when he/she is connected to the cluster, all invitations should be forwarded to his/her client 11, user B's RS sends the invitation message accordingly and the invitation ends up at user's B client 11 for access by user B. In this case it is assumed that on user B's client 11, there exists some code that will accept and process this specific invitation.

Figure 4:
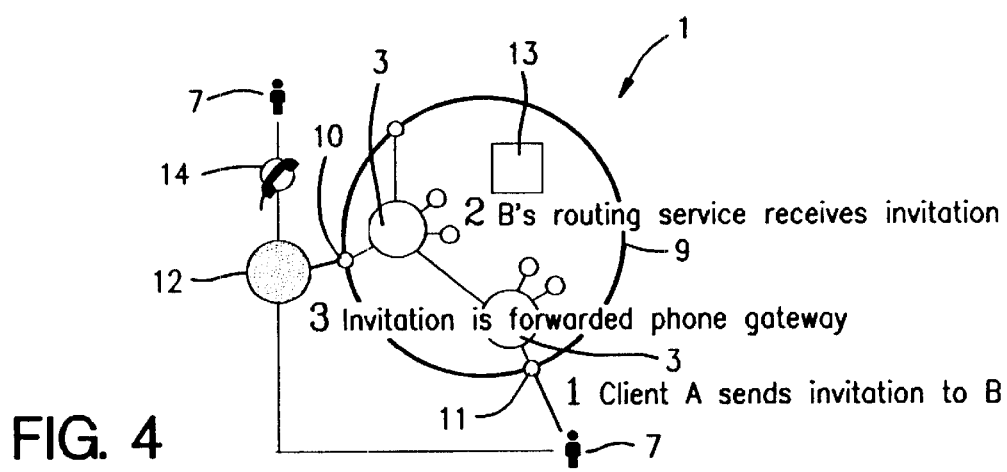
FIG. 4 is a functional diagram illustrating how a first user (client A) sends an invitation message to another user (client B) according to an embodiment of this invention, wherein client B's routing service forward the invitation message to client B's mobile phone because client B's client is not online.

As shown in FIG. 4, in other cases device handlers are not clients 11 of users but instead are actual services 10 running (e.g., on servers or other devices) within the cluster. These services 10 typically interface with some external devices or networks 12 (e.g., telephone or other network), translating the invitation to whatever signaling protocol is adequate for that device or network 12. In FIG. 4, user B has instructed his/her RS to forward invitation messages to his/her mobile phone 14 when user B is not online. Thus, user B's RS forwards the invitation message to service 10 which interfaces with the external cellular telecommunications network (e.g., GSM), which in turn enables the message to be forwarded to the network and ultimately to user B's mobile phone 14. In this manner, a device handler 10 might translate an invitation to an actual phone call to a user.

As stated before, the invitation mechanism does not put any limitations on what type of communication is brokered by a Routing Service (RS). The actual types of communication possible are only limited by the device handlers 10 (and/or client devices 11) available to handle them the another user so desires. The session negotiation does not implicitly involve the exchange of user's network addresses, such as IP number or phone number, in certain embodiments. The benefits of this approach include privacy and the fact that users do not have to worry about how to reach other users. Given an invitation from a user 7, the Routing Service (RS) of the called user 7 (i.e., the callee) will decide how this invitation should be handled, without the calling user 7(i.e., caller) having to know how the communications channel between the users was set-up or on what network. Thus, for example, a voice session might end up in the telephone system without the caller knowing it. It is however up to the actual communication logic invoked whether network addresses actually end up being exchanged, and may be out of the control of the routing protocol and/or the application framework. The decision on whether user anonymity should be maintained for all communication types is thus up to the operator that operates a cluster in certain embodiments of this invention.

As seen above, the functionality of a cluster 1 can be extended by the use of device handlers that are a specific type of services. They are a simple example of additional services that can be added to a cluster. From an architectural point of view, there are no limits on what kind of services can be added to a cluster given an adequate SDK. This opens the way for the creation of complex value added services that possibly interface with some corresponding client modules, offering functionality that goes way beyond the elementary one described above.

Figure 5:
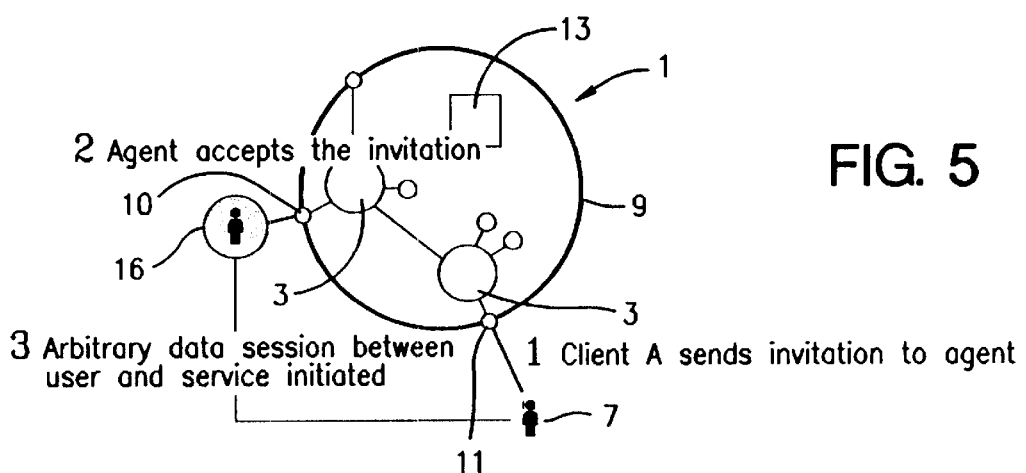
FIG. 5 is a functional diagram illustrating how a first user (client A) sends an invitation message to another user which is a service such as a software entity according to an embodiment of this invention, wherein the software entity's agent or routing service forwards the message to the software entity so that communications can be set up between the first user and the software entity.

Referring to FIG. 5, another entry point for additional services 16 comes through the use of special clients 10. These are services 16 that actually use the client/server protocol to manifest themselves as any other user within the system. Such 'artificial' users 16 are called agents. From a user point of view, an agent looks just like any other user, i.e., he/she can monitor its status and send invitations to it. The difference is that when communication is established between a user 7 and an agent 16, it really is a form of interaction between the user and some software entity. The type of communication might be voice or text, but more likely it would be some custom data communication between the agent and some special client software installed on the user's machine. This type of extensibility allows for novel and interesting services.

As seen above, many services might offer access to chargeable resources, such as the phone system, a cellular telecommunications network, an online shopping network, or the like. This calls for a way to control the access of users 7 to these resources and a to way of monitoring their usage. In certain embodiments, the system/network according to this invention may support the notion of account types for users, where each account type gives access to some set of services. In this manner, control of service usage can be administered easily. For more detailed charging, each service can define its own billing policy and act accordingly. Some services might choose to simply log all activity, for later accounting, while others might dynamically monitor the user and their current account situation, possibly terminating a session if a credit goes down to zero.

Figure 6:
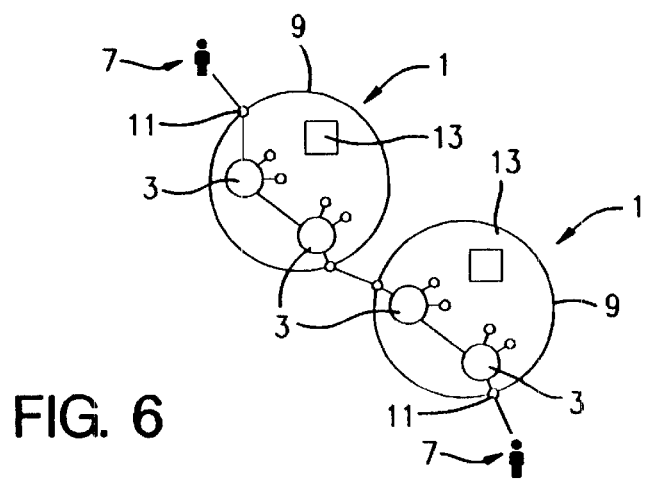
FIG. 6 is a functional diagram according to an embodiment of this invention illustrating that connections between users can be forwarded across clusters.

Referring to FIG. 6, as users 7 have a globally unique identity, connections between users can be forwarded across clusters 1 (i.e., from one cluster 1 to another cluster 1). This may be done via a special service, i.e., the inter-cluster service, that acts as a proxy between services in different clusters. From the point of view of the services involved, the proxy is preferably transparent or substantially transparent. The only limitation is that the cluster operator can configure the inter-cluster service to only allow remote access to a limited set of services. Thus operator specific value added services can be made exclusive for a given cluster.

Figure 7:
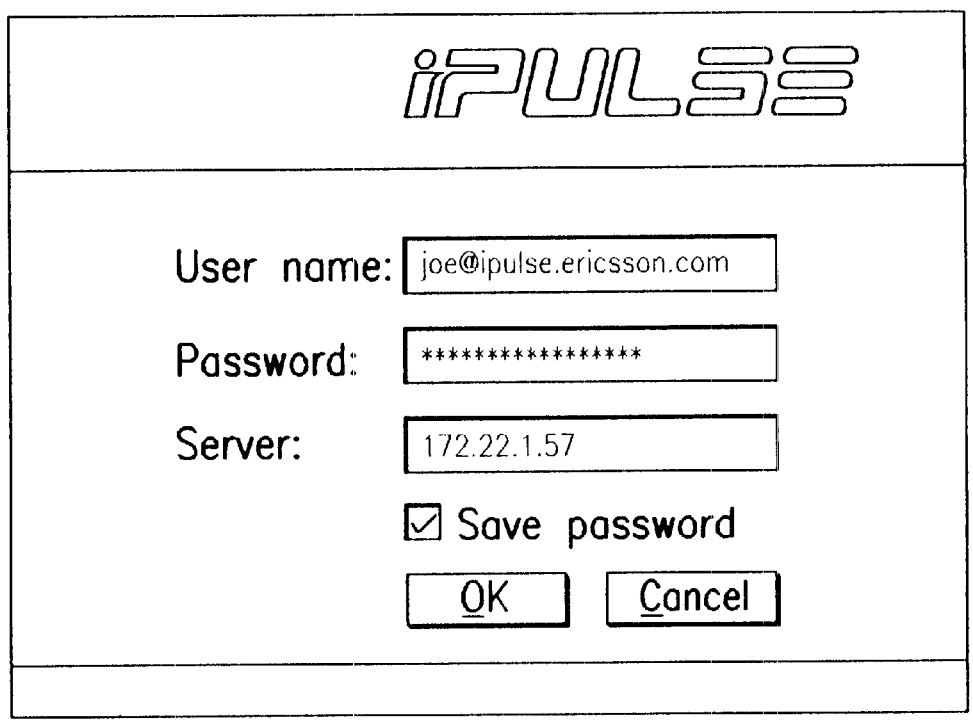
FIG. 7 is a diagram of an exemplary aspect of a client as it appears on a user's display screen (e.g., display of a PC) according to an embodiment of this invention, wherein when launched the client application prompts the user for a user name, password and/or server address; after which the client can connect to the appropriate user server and establish a secure communication with it.

From a user 7's perspective, a client 11 appears to the user as a small inconspicuous application, which in closed form on a user's PC appears as a small ball on the desktop. As shown in FIG. 7, when the user 7 launches the application, he/she is prompted for his user identity, which includes the address to his operator, and a password to be securely authenticated. At this point, the client 11 connects to the corresponding server 3 and establishes a secure connection with it. The connection is both strongly authenticated and may well as encrypted, using known state-of-the-art cryptographic technology, and can thus not be cracked by mischievous parties.

Figure 12B:
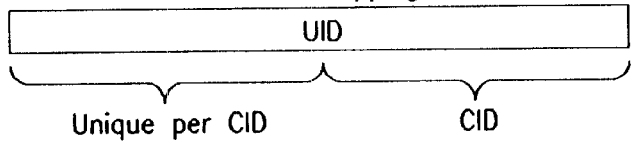
FIG. 12(b) illustrates a user identification (UID) which is given to a user, that is applicable throughout the entire application or system/network, according to an embodiment of this invention.

If logging on is successful, the ball may open and expose a variety of functions and displays which may be utilized by the user/client. One such function is known as a contact list (e.g., FIG. 8 illustrates a portion of such a list). This list is maintained by the user and may include, e.g., other individuals that the users knows and has contact with and optionally addresses or IDs of the other users. In certain embodiments, the list may show the online status of these other users. This status reflects whether a given user is currently logged in the system or not, thus giving information whether that user 7 is immediately reachable. Actually, users have a range of possible statuses they can specify, e.g., to inform other users that they are indeed online, but wish to not be disturbed or are temporarily unavailable. The list can easily be organized by defining folders, as well as choose from different display modes. The user can enter new contacts, either by typing in their system/network identity (user ID or UID) (if they know it) or by initiating a search in a directory service, where they can search according to various criteria, such as names, e-mail, et cetera. An exemplary UID assigned to a user is shown in FIG. 12(b).

The client 11 architecture may be open via the use of an Add-On SDK. This allows developers to add new type(s) of communication modules to the client, e.g., to establish data communication sessions with some remote service. In this manner, the client can be used as a basis for more complicated applications, while still benefiting from the whole underlying user and security model offered by the basic client. The client/server protocol can also be used to create completely new type of clients, that allow developers to integrate services that manifest themselves as users to others. The security protocol preferably used by the client is SSH (Secure Shell Protocol), which is generally considered one of the most advanced today. It uses the dedicated port number 22, which is generally open on most firewalls. For communication sessions established by add-ons, the security is up to the add-on developer and the communication protocol that is used. All the information specific to a logged in user, such as his contact list and inbox is cached and encrypted on the client machine, thus minimizing network traffic for frequent users. The client is fully localizable, and can also be co-branded for specific operators.

As for servers 3, a exemplary server setup according to an embodiment of this invention includes a network of servers 3 and one database 13. Such a minimal setup is called a cluster, and represents a small administrative structure of the system/network. Each server 3 can be configured to run a certain configuration of services. Each such service is either some integral part of the system/network of this invention or some additional service installed by the operator. One of the basic services available is the connection and authentication service that handles client 11 access(es) to the cluster 1. This is the single point of access into the cluster from the IP network, and the cluster should otherwise be considered as running in a trusted or secure LAN. By adding more servers 3 running this service, the whole cluster can be scaled to handle a potentially large number of simultaneous connections. Another set of services are related to users 7, and handle information requests, propagation of online status and routing of invitations. Again, these functions can be scaled by adding more servers 3 running these services. Finally, a specific service handles connections to other clusters, thus allowing users from different clusters and providers to communicate. Linking of servers 3 will be discussed below in more detail.

All these services of a cluster 1 may interact with the database 13, which is the repository of all persistent data. This includes both user specific data, service specific data and administrative data. The database can be scaled, made redundant and as robust as the operator wishes, all depending on needs. An Oracle database may be used, but the system/network can be adapted to other types of databases. Thus, in certain embodiments of this invention, all this information is stored centrally on the server side in database 13 of the user's cluster 1, and is downloaded to the user's client 11 when the user 7 logs in. This makes it possible to use any installed client that is compatible with the system/network without preliminary customization.

By selecting users from this contact list, a variety of functions become available to the selecting user 7. To start with, the selecting user 7 can display information about a given contact (e.g., a selected user from the list). This information may be a combination of items that the contact has actually defined for himself, e.g., preferred nickname and other public information. In addition, a function which becomes available to the selecting user 7 is the ability to send invitations to the selected contact from the list. The notion of invitation here is a very generic one, and may use an upcoming standard protocol called SIP (Session Initiation Protocol). As described earlier, an invitation may be a request sent from one user 7 to another user 7, asking the another user 7 to join the inviting user 7 in a communication session of a given type. As a comparison, dialing the number of a person on a telephone is essentially sending an invitation (in the form of a telephone ring) to that person.

There is no limitation on what kind of invitations can be sent. A sending user 7 is provided with at least a few elementary types of invitations as well as the necessary logic to handle the corresponding communication sessions if they do get established. Referring to FIG. 9, these elementary types include the following: 1) Pages: these consist of short text messages (they are the most simple type of invitations, although they do not imply an acknowledgement from the receiving end; 2) Text Chat: these invitations can establish a real-time text chat session between the users; 3) Voice Chat: these invitations can establish a real-time voice session between the users; and 4) Web Conference: these invitation allow users to share navigation on the Web, such that the Web navigation of one user is reflected on the other user's browser.

According to preferred embodiments of this invention, a noteworthy aspect is how invitations are handled on the receiving end. In preferred embodiments, invitations are never sent from the sending user 7 directly to the receiving user 7 or the receiving user's client 11. To the contrary, at least one RS is utilized as discussed above. Indeed, invitations can be sent regardless of online status, and thus the receiver might not be online at all. The invitation is submitted to the receiving user's RS that runs continuously on the receiving user's user server (US). The receiving RS decides what to do with the invitation according to user specified logic and available back-end services. As a simple example, simple text pages might be handled in three different manners, depending on preferences: A user might choose to be notified immediately of such pages if he is online (e.g., FIG. 3). He might also specify that if online but marked as 'Do not disturb', the message would go his inbox for later reading. Finally, he might decide that if he is not online, the text page should be forwarded as an SMS message to their mobile phone (or some other paging network) (e.g., FIG. 4). The same applies for all other types of invitations. Thus a voice chat invitation might actually end up as a phone call, if that service is offered in the back-end by the operator or it might result as a pure IP call, if both users are online.

This functionality becomes increasingly useful as more services and networks are hooked to the system/network of this invention. It also is the basis for the extension of the client 11 to other type(s) of terminals such as smart phones and PDAs. Confronted with that complexity, routing services offer benefits both for the caller (invitor) and the callee (invitee). For the caller it hides the messy details on how to locate and reach a given person/user 7 at any given time. For the callee it allows him/her to control who can reach him/her and how, without having to disclose any personal information such as phone numbers or network addresses to the caller. Thus, certain embodiments of this invention essentially define unique identities for users 7, which can be used to communicate with other users and/or services, using all communications protocols/types available, while still retaining a high level of security and anonymity.

A minimum setup can consist of a single server machine running all necessary services, as well as one machine running the database. However, in preferred embodiments, multiple servers 3 are provided at each cluster 1 as shown in the drawings of this application.

Administration of a cluster 1 is preferably handled by a specific administration client, that manipulates database records and also displays alerts and logs issued from the cluster.

Thus, as can be seen from the above, the system/network of this invention is a lightweight server framework, providing a simple and secure user model and routing of invitations to external services. As such it does not impose any significant limitation(s) on which service is hooked up to it, while still allowing for a unified interface to users and billing. Users in different clusters can communicate with each other, though the actual personal user information is securely held within the administrative boundary of the cluster in which the user is registered.

Set forth below is a more detailed description of certain aspects of this invention.

With regard to scalability, in certain preferred embodiments of this invention, the back-end is able to support a user base of tens of millions of users, with a couple of million simultaneously online users. Practically, this means that the back-end may have virtually unlimited scalability as applies to splitting load across multiple clusters, and within each cluster between machines, processors, processes, threads etc., and load balancing. A single cluster 1 in itself may have an upper limit to its scalability, but the whole back-end, being an interconnection of many separate clusters 1, may be scalable without practical limit. Herein, a cluster is limited in scalability by the scalability of the database 13 used; no other practical limitations on scalability exist. Since databases 13 today can be scaled very well (although not without limits) by throwing money at them, this is perceived as a good design choice.

With regard to being robust, given an error free run of the hardware, each server's uptime is preferably above 99.9%, and the uptime of the network preferably above 99.99% in certain embodiments. When exceptional errors occur, such as hardware errors, a maximum 3–5 min. lag is accepted. Essentially these state that when a server 3 is taken down, or breaks down, another server must automatically take over its role. Further, any single point of failure, such as databases or even hardware parts (such as networks) are preferably redundant and automatically taken over by other parts if they fail.

It is often desirable that communication between clients and the backend be as secure as possible, within reason from a practical standpoint. The best approach to this is to use authentication when connecting to a client and to encode all messages between clients and the backend using strong cryptography.

In certain embodiments of this invention, each operator is able to run a cluster (or clusters) of servers to serve its users group. These distributed server clusters are preferably able to interoperate in order to maintain the whole community. Additionally, it is preferably that spamming be prevented if possible, through the use of both preventative measures and countermeasures.

As for the overall architecture, wherever standards fit the needs of the application design, they should be used. Moreover, any add-on service that needs integration with the basic services of the backend preferably connects to it in a "plug-in" fashion.

Turning to the overall server structure, reference is made to FIG. 10. Each operator runs one or more clusters 1 of servers 3. Each cluster 1 runs on a high speed, reliable and secure LAN. Reliability may be enhanced by having two (or more) duplicate LANs, thus giving n-1/n redundancy where n is the number of duplicate LANs. Security may be enhanced by keeping the LAN in a locked room. The clusters 1 are interconnected via a network connection 17 that is preferably high speed but may be regarded as unreliable and unsecure. Note that this does not mean that communications according to certain aspects of this invention across this network 17 will be unsecure; it means that since the network 17 (e.g., packet switched digital network) does not provide security, certain aspects of this invention preferably provide it. Note also that the reason for regarding the inter-cluster network as unreliable is that it is intended that there is no requirement for a reliable network between clusters; it does not mean that the operator cannot set up a reliable network 19 if he/she so wishes. Considering the requirements to the back-end, FIG. 10 illustrates the subdivision of servers 3 in each cluster 1. Further explanation follows.

Figures 11, 12A:
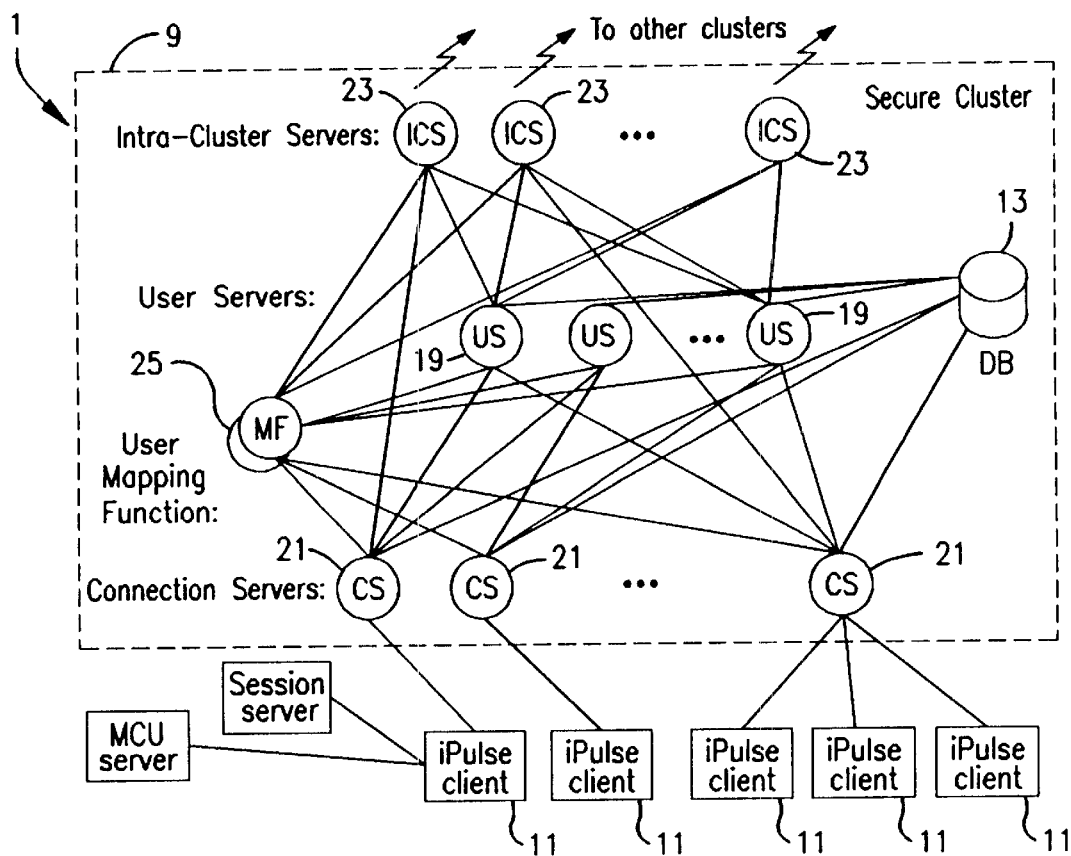
FIG. 11 is a functional diagram illustrating the server structure (e.g., communication links between respective servers and between servers and respective clients and database(s).
FIG. 12(a) is a diagram illustrating how an exemplary mapping function of FIG. 11 works according to an embodiment of this invention.

FIG. 11 illustrates an exemplary cluster 1 including a plurality of servers 3 and a database 13 therein. Numerous clients 11 are connected to the cluster 1. Servers 3 in the cluster include user servers (US) 19, connection servers (CS) 21, and intra-cluster servers (ICS) 23. Set forth below in Table 1 is a list of certain roles that certain servers 3 in the FIG. 11 cluster 1 have in certain embodiments of this invention.

TABLE 1

Servers in the backend and their roles

| ABBREVIA-TION | FULL NAME | EXPLANATION |
|---|---|---|
| ICS | Intra-Cluster Server | Connects to remote ICSs as needed. Listens for connections form remote ICSs. Subscribes user status at other clusters in order to maintain correct contact status for local users. Forwards local user status to subscribe remote ICSs in order to maintain correct contact status for remote users. Forwards messages from remote ICSs to local USs. Forwards messages from local CSs to remote ICSs. |
| DB | Database | All data that needs to be persisted may be kept in a single logical database 13 per cluster. |
| US | User Server | Maintains the user state for a given set of user(s). Keeps track of contact lists and blinded lists for these user(s). Keeps track of routing for these user(s). Forwards user status changes to interested CSs and ICSs. Routes pages for these user(s) via RS. |
| UMF | User mapping function | Maps a given local user to a specific US. Maps a user at another cluster to a specific ICS through the CID associated with the user. Monitors the status of the servers in the cluster. Readjusts maps when a server fails, is removed or added, and notifies other servers as needed. Load balances USs and ICSs. |
| CS | Connection Server | Listens for connections from clients. Forwards status updates on connected clients to the US(s) that is handling them. Subscribes on status changes from USs for the contact lists of connected clients. Forwards the status changes to the clients. Forwards paging from connected clients to US(s) and vice versa. |

In certain embodiments of this invention, connections between servers 3 need not be static, in the sense that a connection will not be maintained between two servers unless software entities within the two servers 3 are communicating. However, connections between servers 3 may be shared, so that if a connection is already open between two servers, then rather than opening a new connection when two additional software entities on the servers wish to interact, the already open one will be shared.

With regard to user identification and mapping, each user 7 is given a user ID (a UID), which is applicable throughout the whole of the application. Each cluster 1 is assigned a cluster ID (a CID). A CID is encoded in a well known way into each UID, as shown in FIG. 12(b). Each user server (US) 19 is given a user server ID (a USID). It is the role of the user mapping function (UMF) 25 to map local UIDs (local by the fact that their CID is the local cluster identifier) to USIDs. FIG. 12(a) illustrates an example of how the mapping mechanism may work in certain embodiments of this invention. This mapping is dynamic since it can change if a user server crashes, is removed, or if a user server is added.

Intra-cluster servers 23 are given cluster server ids, ICSIDs. Each ICS handles all remote users 7 that have UIDs that map to a set of CIDs. It is the UMF 25's role to map UIDs of remote users to ICSIDs. This mapping is dynamic in the same way and for the same reasons as the local UID to USID mapping. Each intra-cluster server 23 with the identification ICSID handles a set of remote CIDs (or part of a CID). It is the UMF's role to map UIDs which belong to remote clusters (i.e. have remote CIDs) to ICSIDs. This mapping is dynamic in the same way and for the same reasons as the RID to USID mapping.

TABLE 2

Maps from UIDs to other identifiers

| MAPPING | ABBRE-VIATION | NOTES |
|---|---|---|
| ClusterID(UID) | CID | static mapping |
| UserServerID(local UID) | USID | known by UMF, dynamic mapping |
| IntraClusterServerID (remote UID) | ICSID | known by UMF, dynamic mapping |

UIDs are URIs, e.g., in the form joe@net.com. The part after the @ sign is the CID. This choice of UID is made for future interoperability and compatibility with other systems, i.e. SIP (which is used for session initiation).

The nature of the backend and the preferred robustness may call for a reliable network protocol in certain embodiments. Also, the requirements for the system may call for a secure, authenticated, and/or encrypted communications medium. Thus, the SSH protocol running over TCP/IP may be chosen for all server intercommunications in certain embodiments, as well as the communication between clients and connection servers. Those skilled in the art will recognized that other protocols may also be used in alternative embodiments. SSH exposes abstractions called "connections" and "streams." A connection is an end-to-end connection between two computers which can be authenticated and encrypted and which can provide data integrity. A stream is a named, bi-directional, flow-controlled stream between two software entities on the separate computers. Many streams may be opened on any given connection, onto which they are multiplexed and separately flow-controlled. As an analogy, one may think of a connection as an electrical cable, and streams as the many separate, insulated copper wires within the cable.

Figure 13:
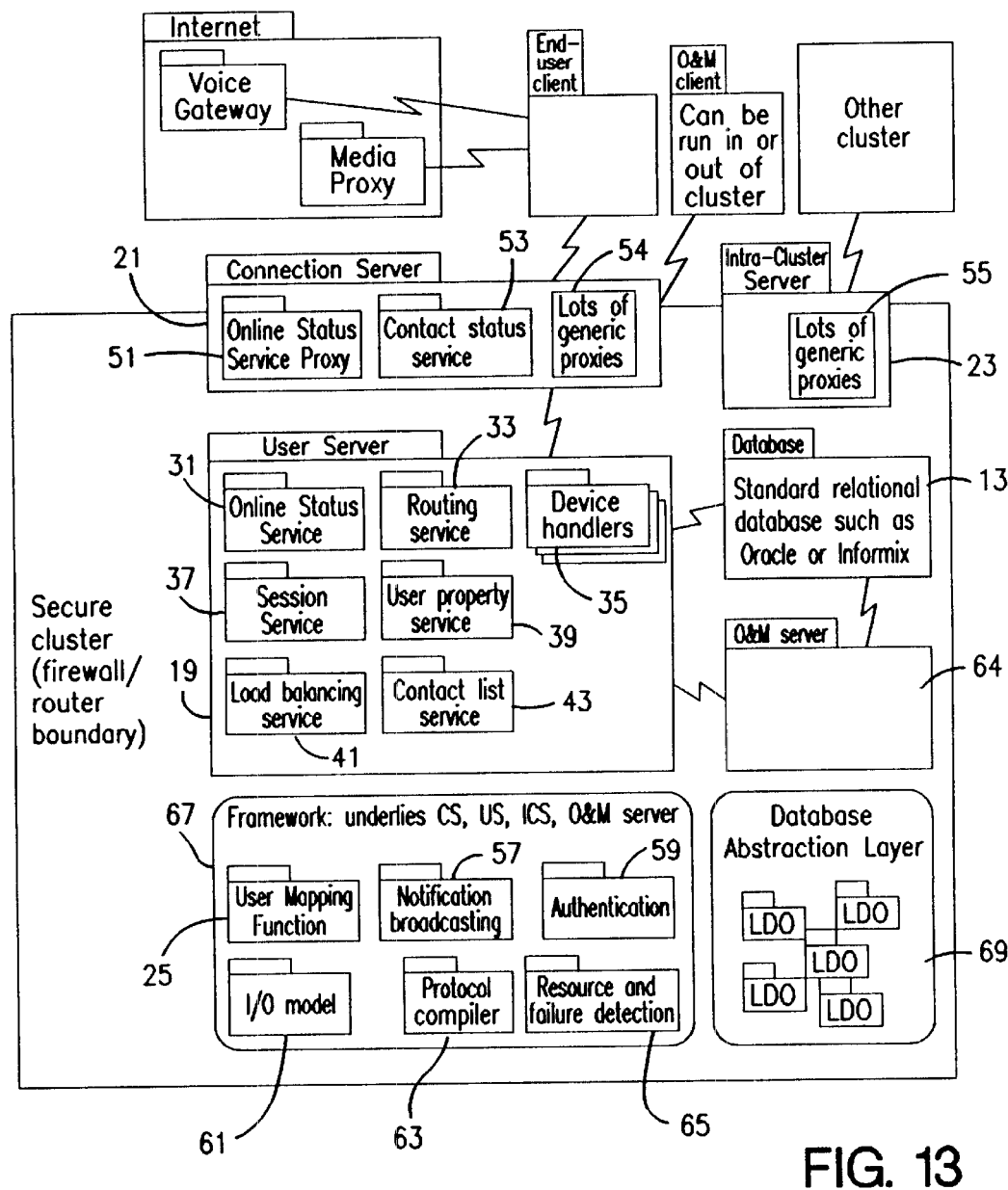
FIG. 13 is a functional block diagram illustrating exemplary components of the cluster of FIG. 11 according to an embodiment of this invention, and further illustrating how the cluster may communicate with other entities such as clients, other cluster(s), and/or the Internet.

FIG. 13 illustrates the way the system/network of this invention may be broken into components, and some of the dependencies between components. Each component has various responsibility(ies) in the overall system/network.

As can be seen, the user servers (US) 19 includes online status service 31, user routing service(s) (RS) 33, device handlers 35, session service 37, user property service 39, load balancing service 41, and contact list service 43. Connection servers (CS) 21 include online status service proxy 51, contact status service 53, and lots of generic proxies 54. Intra-cluster servers (ICS) 23 include lots of generic proxies 55. The framework underlying each of these servers includes a UMF 25, notification broadcasting 57, authentication 59, I/O model 61, protocol compiler 63, and resource and failure detection 65. Operation and maintenance (O & M) server(s) 64 handles system configuration (e.g., provision/assignment of users) and/or monitoring of servers/clients in certain embodiments.

Still referring to FIG. 13, the online status service 31 stores users' online statuses, and broadcasts changes to these to subscribed contact status services the online status service proxy 51 sits between the client 11 and the US 19, forwarding requests to change the client's user's online status; it handles failure tolerance in case the client's US fails. In the case where the US fails, the proxy 51 will try to contact the US 19 that the UMF 25 has allocated for the user after the US crash, and establish the user's online status on that server. The contact status service 53 subscribes to the online status of every user from its client's contact list. The contact list service 43 stores each user's contact list, allows the user 7 to access and manage it, and allows other services to read it (a blinded list may be a group in the contact list). The routing service (RS) 33 receives messages from users, and sends them to the correct device according to routing logic which resides at both the sending user's and the receiving user's side and can be set up by either user. The RS 33 allows users to access and manage their routing table.

Generic proxy(ies) 54, 55 resides on a CS 21 or an ICS 23. This component's responsibility is to act as a dumb, byte-forwarding proxy to many different services which reside on USs 19. Each device handler 35 at a server can receive messages, pass them to the user or an external system (such as SMS), store them, act on them, etc. Thus, device handlers 35 can act as bridges to external systems. The user property service 39 allows users 7 to read and change their own user profile, and to read those parts of other user's 7 profiles that they have access to.

Authentication 59 handles the authentication of clients 11 when they first connect to the back-end, and is part of the framework component 67. Notification broadcasting 57 allows back-end components to broadcast messages on several channels to all other components in the cluster, and to listen for messages on certain channels. Notification broadcasting 57 is also part of the framework component 67 as illustrated in FIG. 13. Protocol compiler 63 need not in itself be part of the system, although code generated by it becomes part of the system (part of each service it is generated for). The protocol compiler 63 compiles PDL (Protocol Description Language) files, which are an abstract definition of the protocol between a client and a server or a server and a server, into code for both client and server which implements the transport of these protocols and hides the complexity of how protocol messages are sent back and forth between the client and the server. I/O model 61 handles thread pooling and synchronization, database connection pooling, I/O usage, timed alarms etc. and abstracts these for the other services. Resource and failure detection function 65 listens for the failure of USs 19, ICSs 23 and CSs 21 and broadcasts a message through the notification broadcasting mechanism if one of them goes down. Again, this is part of the framework component that underlies each of the CS, US, ICS, and O&M server. User mapping function 25 maps user IDs to User Servers. This function is piecewise-defined, with pieces of the function getting defined only as needed. There is also a mechanism that reclaims and undefines pieces that have not been used for some time. The function is persisted to the DB 13. The function keeps the mapping of user IDs to servers for CSs and ICSs (UserServerID(UID) and IntraClusterServerID(UID). Framework 67 is thus responsible for providing a decent environment in which to write services, which transparently (to the services) ensures scalability and robustness.

Load balancing service 41 allocates resources which are external to the cluster in a fashion which load balances the resource usage. The idea here is that a client 11 may wish to use the services of servers which are not implemented within the cluster yet form an integral part of the application and should thus be allocated (and administered) as conceptually a part of the cluster. The session service 37 handles session creation, setup and management as well as data transfer between members of the session.

Administrative tools allow system administrators to change certain settings of the system, add new users, etc. They are responsible for notifying all components in a cluster of changes to settings that affect them.

Database abstraction layer 69 provides a unified way of accessing the database 13 used in the cluster. Layer 69 provides access to several LDOs (Logical Data Objects) which are user-defined (i.e. defined by service creators) objects in the DB 13 which provide an abstraction for some data structure stored in the database.

Responsibilities of framework 67 include the following:

A. Provide an environment which efficiently handles matters such as I/O, timed alarms, thread pooling, message broadcasting, database connection pooling and logging, hiding the complexity from the service creator.

B. Expose abstractions to service creators which make their life easier. These include abstractions related to I/O, the database and data stored therein, alarms, message broadcasting (notifications) and logging.

C. Perform caching of data within the data abstractions supplied.

D. Reuse existing data abstraction object instances when this is efficient.

E. Supply a non-ambiguous method of specifying a protocol description.

F. Implement a process which can, given a protocol description, output code which implements the details of how to encode protocol requests for sending them over the wire and how to use the I/O primitives supplied by the framework. In essence, this process hides from the service creator and the client implementor the fact that the client using the service does not run on the same computer.

G. Uniquely identify instances of services and supply a registry of these so that connections may be made to previously existing instances.

H. Hide from service creators the fact that when their service communicates with other instances of the same service or instances of different services, these instances may be located on different computers within the same cluster or even on computers within remote clusters.

I. Ensure authentication, security and integrity in all communications so that service creators can always take these for granted.

The threading model exposed to services in the framework 67 is what has on occasion been termed a rental apartment. An apartment is defined as "the context a tenant is called in". The fact that the tenant is only renting the apartment means that a tenant may not always be called in the same context (i.e. on the same thread) but since tenants only live in one apartment at a time, the analogy can be extended to say that a tenant will never be called in more than one context at the same time (i.e. no more than one thread will ever be active in the code owned by the tenant). Services are "tenant owned". What we mean by this is that the code for a given instance of a given service is attached to a tenant. The service creator can therefore assume the rental apartment model when writing the service, and does not need to worry about threading issues at all. The framework keeps a pool of threads into which threads are added as needed up to a maximum. These threads are then reused when work needs to be done. Each thread is active in one and only one tenant's code at a time. When work needs to be done, the framework waits until a thread is available, hands it the assignment (a description of an event that needs to be processed), and marks it unavailable for the time being. When the thread finishes, it notifies the framework, which then returns the thread to the available state in the thread pool. The reason for using a thread pool is that performance increases as more threads are allocated to doing separate jobs, up to a maximum (system dependent). This means that we can only have a maximum number of threads running at a time, but we have a number of jobs that need to be concurrent and which need a fair share of the processing power available. The thread pool method solves both of these problems.

As for I/O 61, the framework 67 preferably uses an implementation of the SSH standard protocol for all communications between clients and servers, between servers within a cluster, and between servers in different clusters. SSH provides authentication, encryption and integrity to all communications. It also supplies abstractions called connections and streams. Streams are the main I/O abstraction used in the framework. The framework exposes an abstraction equivalent to an SSH stream to services.

With regard to connection requests, an instance of a service in the framework only exists as long as a stream is attached to it. The process of attaching a stream to a service will now be discussed. Streams are opened with two explicit parameters and one implicit parameter. The implicit parameter is the UID of the user opening the stream, which we will call the source UID. The explicit parameters are the name of the stream which we will call the "stream type", and a UID which we will call the destination UID. This UID might be the UID of the user opening the stream or the UID of a different user. We previously mentioned that one of the framework's responsibilities is to uniquely identify instances of services. We can now define what constitutes this unique identification: it is the type of the stream that is connected to the service and the destination UID as defined above.

When creating a service, two main parts are created: an object to which streams can be attached, referred to as a stream connector, and an object which knows where to connect connection requests, called a locator. A part which implements the actual functionality of the service may also be created. At initialization time, a server based on the framework registers all the locators it knows about under the name of the stream type(s) they handle. Any given locator is registered as the object which knows where to connect connection requests for streams of a certain type or types.

We can now explain how a connection request may be handled. When the framework receives a connection request from SSH for stream type X and destination UID Y, it finds the locator registered for stream type X and passes it the connection request. The locator checks the destination UID, Y, and based on what the UID is, it does one of the following: 1) creates a new tenant and a new stream connector, attaches the stream connector to the tenant and connects the stream to the new stream connector, and registers the new tenant as "the tenant to which the service for stream type X and destination UID Y is attached" (read that again if you didn't get it, it's important; remember what we said about how we identify instances of services); or it 2) finds an existing tenant that was already registered for stream type X and destination UID Y and connects the stream to the stream connector already attached to the tenant; 3) It creates a new tenant (as above) regardless of whether a tenant already exists for the same (X, Y) pair. This is appropriate when it is not necessary for different connections to the "same" instance of a service to share state.

The stream connector looks at the source UID of the connection request and decides whether it wants to accept the connection based on who is connecting. Different services will behave differently in this respect. A single locator can in fact be registered as the locator for more than one stream type. This means that a single service can in fact accept connections from more than one stream type. When we add the fact that a separate protocol, specified in a protocol description, is spoken across each stream, we see that this model starts to look a bit like we're implementing a C++ class which inherits from one or more purely abstract base classes.

Now that we have covered the details, we can step back and see the whole picture. Each service has a "type" (or types) which is the type (or types) of streams that it accepts connections from. Each instance of a service is "owned" by a single user (the destination UID). The service creator can decide whether he/she wants all connections to a (service type, destination UID) pair to be connected to a single instance of the service or always to a new instance.

Up until now we've assumed that the entity that is asking for the stream to be connected is the client. The fact is that services can themselves connect streams to other instances of the same service, or to instances of different services, simply by specifying the source UID, destination UID and type of the service they want to connect to. This means that we now have a framework which supports abstract stream I/O between clients and servers, and between servers and servers.

At times it may be necessary for an instance of a service to send a broadcast message (referred to as a notification) to "all interested parties" without knowing who these parties are. The framework supplies a method and function 57 for doing this, as well as for listening to notifications that you're interested in. The abstraction that the framework supplies to services is as follows. A service can send a notification (which is simply a binary packet with arbitrary data) onto a specific named channel. A service can listen to specific named channels and will receive a call into its code when a notification arrives on one of these channels.

PDL is short for Protocol Description Language. This is the frameworks solution for a non-ambiguous definition of a protocol between a client and a service (when we talk about clients in this context, we are also talking about services which open up streams). The PDL compiler 63 is a software tool which takes PDL as input and spits out much code, both on the client side and on the server side. On the client side, it spits out a COM DLL which implements COM interfaces specific to each protocol which allow client applications to use the protocol as if it were a normal COM object. On the server side, it produces two main things: code for services to act as clients to the protocol, and code for services to implement the protocol. The code for implementing a service is split into two: an object which allows the service creator to call back to the client as if the client were a C++ class residing in the same process space as the service, and a C++ class which is purely abstract which the service creator must inherit from to implement the methods defined in the protocol. These two parts are a high-level enough abstraction that the service creator can, if he chooses, ignore the fact that the underlying I/O abstraction is a stream (he can even ignore the fact that there is any I/O going on). The only concession to complexity that the service creator has to make is that all calls are asynchronous, i.e. if he wants to send back a "return value" to the client he must do so through a new, separate method call. Note that although PDL and the PDL compiler 63 are supplied by the framework to ease the pain of writing protocol stacks by hand, the underlying stream abstraction is there for the service creator if he/she chooses to use it. Also, the PDL generated code allows the programmer to poke a bit at its interior parts to change its behavior.

The database abstraction layer 69's job is to provide service creators with easy access to data, and to cache data, pool database connections, and reuse data objects. The main parts of the database abstraction layer visible to a service creator are the registry and several LDOs (Logical Data Objects). An LDO is an abstraction for some specific type of data, i.e. for a specific table or set of tables in a relational database. Usually it will be created in conjunction with the creation of a service, either by the service creator herself or by a separate LDO creator. LDOs can handle caching the data they represent if they choose to do so. The registry is the place where existing LDOs are registered. LDOs, like services, are registered by type and by the UID which "owns" them. When a service wants an LDO, it asks the registry for an LDO of a specific type, owned by a specific user. The registry then acts similarly to the way locators act on connection requests, i.e. it either creates a new LDO of the requested type or reuses a currently existing LDO. A pool of database connections is maintained by the database abstraction layer. This is similar in function and in design to the thread pool maintained by the framework.

As for UMF 25, the following describes how the framework knows which server a specific instance of a service resides on. Services are identified by type and destination UID. The user mapping function (UMF) 25 is a piecewise-defined function which specifies on which US the service instances for a given UID are located. If a server goes down, the UMF will change its mapping so that users which were on that server should almost immediately be able to reconnect and receive service from USs in the cluster that did not go down. If a server is added to the cluster, the UMF will start using that server for new connections until it is at full capacity. The user mapping function (UMF) 25 itself is preferably stored in the database, but the code which handles keeping the function correct is implemented on each server 3 (19, 21, 23) based on the framework. In clusters 1 which are connected to other clusters, there are preferably two UMFs: the internal UMF and the external UMF. The internal UMF is used by CSs and USs to locate USs and ICSs, and by ICSs to locate USs for local cluster UIDs. The external UMF is used by ICSs to locate ICSs for external UIDs.

Although not logically part of the framework (it's a service), the generic proxy 54, 55 is one of the core services supplied with the framework. Generic proxies act as byte-forwarding proxies from one stream to another. On CSs 21, generic proxies 54 are used in the following way: A generic proxy is registered for each protocol that clients are supposed to have access to in the back-end. When the generic proxy gets a connection request (type=x, src UID=y, dst UID=z), it will accept it, then ask its framework to open a stream with parameters (x, y, z). Since the internal UMF is being used on CSs 21, this will open a stream to the US 19 servicing destination UID z, or to the ICS 23 which is acting as a bridge to the cluster user z resides on. On other server types (e.g., US and/or ICS), generic proxies 55 are used in the same way. The difference here is that for connection requests coming from external clusters, the internal mapping function is used, but for connection requests coming from within the local cluster, the external mapping function is used. As can be seen from analysis of the above, the framework stream model, the UMF and generic proxies on ICSs allow services to connect to services for any user that can be reached in the network without knowing any details except the type of service that is to be connected to and the UID of the user to be connected to.

Routing is handled by the routing service (RS) 33, which resides on the US for a given user, as dictated by the UMF 25. For example, when user A sends user B a message as in FIG. 3, the following happens: 1) User A's client sends user A's routing service the message; 2) User A's routing service 33 on user A's US 19 runs its "outgoing routing logic" with the message and some other parameters as input (the routing logic will probably end by deciding to send the message to user B's routing service on user B's US); 3) User B's routing service 33 receives the message from user A's routing service, and runs its "incoming routing logic" on it (this logic will probably end by deciding to send the message to user B's client (if connected) and store the message). Optionally, user A's client may receive the message and a pop up window with the new message. A message (as applies to the routing service) is a string which, e.g., may be formatted according to the SIP standard. The format of the body of the message is dependent on the message type. In an RS 33 for a given user, both the outgoing routing logic and the incoming routing logic can decide to forward the message to a device handler (and optionally process it further once the device handler has processed it), store the message in the user's message box, deliver the message to a different user's routing service, or deliver the message down to the user's client. Users may request that a receipt of delivery be sent to them when a) the message they sent is stored in the recipient's message box, b) when the message they sent is sent to the receiving user's client.

To prevent spamming and denial-of-service attacks, the sending of multi-recipient messages may not be allowed in certain embodiments. This means that if the client wants to send the same message to 15 users, that is what the client does, i.e. sends the same message 15 times. This means that in such embodiments the servers cannot be used to multiplex messages to users, thereby making denial-of-service attacks harder to perform as well as making it time-consuming to send messages to multiple recipients.

Herein, a device is anything which can receive a message. Each device can receive a specific message type or set of message types (e.g., from an RS 33). Each device also has a specific type, a device type. Associated with the type is the set of message types it can receive, and optionally what identifier type to use to identify the device (e.g. a phone number for a phone terminal). Software components called "device handlers" represent devices in the system. In some cases, the device is purely conceptual and the device handler itself can in fact be viewed as the device. Device handlers are normal services in every aspect, except for the fact that all device handlers can handle the same protocol. This protocol allows the routing service 33 to pass messages to the device handler for handling, and for the device handler to pass them back.

Routing logic (i.e. which choices are made to decide what to do with a message) may be implemented, e.g., by an RS 33, in a special-purpose pseudo-programming language dubbed RoutingTree, which is in essence a tree of nodes where all non-leaf nodes are decision points and leaf nodes are action nodes. Decisions at decision nodes can be made on a number of parameters, including the contents of the message being routed, the time and date, the state of certain parts of the database, etc. For each user, several different named routing profiles may be specified. Each routing profile contains a RoutingTree-specified routing logic. Routing profiles may be defined by the client. One routing profile is always active as the routing profile to use for incoming messages (which one to use may be defined by the client), and whenever the client sends a message it specifies which routing profile to use for the outgoing message. In this way, different routing profiles may be used for different situations, i.e. one routing profile for when the user is at work, one routing profile for when she is at home, one for when the user is on-line, etc.

For session initiation (i.e. inviting another user to a session, accepting an invitation, etc.), in certain embodiments a subset of the Session Initiation Protocol (SIP, [1]) may be used. The SIP methods used include, e.g., the INVITE, ACK and CANCEL methods. SIP is explained, for example, in Handley/Schulzrinne/Schooler/Rosenberg, "SIP: Session Initiation Protocol," Internet Draft, Internet Engineering Task Force, August, 1998, the disclosure of which is hereby incorporated herein by reference. These suffice for users to initiate conferences and invite other users to them, or for two users to initiate a point-to-point conference. For session description, the Session Description Protocol is used. The Session Description Protocol is explained, for example, in M.

Handley and V. Jacobsen, "SDP: Session Description Protocol," RFC 2327, Internet Engineering Task Force, April 1998, the disclosure of which is hereby incorporated herein by reference.

Different types of routing schemes may be used in this invention. In certain embodiments, plug-ins to the system could define their own routing scheme which would be used concurrently with the preferred scheme described below. In one preferred embodiment, the following in Table 3 are the message types (e.g., page, autoreply, invitation-request, invitation-reply, etc.) of a preferred routing scheme. More types may be added if necessary.

TABLE 3

Message types defined by the routing scheme

| | |
|---|---|
| page | A short text message, sent by one user to another. |
| auto-reply | An automatic response to a message sent by a user. |
| invitation-request | An invitation to join a conference sent by one user to another. The body of the message contains an SIP INVITE request header. |

TABLE 3-continued

Message types defined by the routing scheme

| | |
|---|---|
| invitation-reply | A reply to an invitation to join a conference. The body of the message is an SIP INVITE reply header. |
| invitation-setup-request | A session setup request sent once the invited user has agreed to participate, e.g., a SIP ACK request. |
| invitation-setup-reply | A session setup reply, á la a SIP ACK reply. |
| invitation-cancel-request | A cancellation of an invitation, e.g., SIP CANCEL. |
| invitation-bye-request | Sent when leaving a session, á la SIP BYE. |

A user's "inbox" is part of the user's routing service 33. The inbox receives any kind of message to a user. When this happens, it sends notification of the message to the user (or the user's client) if the user is online. The user may enumerate the message identifiers stored in the inbox and whether each of the messages is read or unread. He or she may retrieve messages from the Inbox, mark them unread or read, or delete them. The user may also store messages in the Inbox. In certain embodiments, the community operator will periodically check for very large inboxes (i.e., large volumes), notify the user (by paging him/her) that the oldest X messages in his inbox will be deleted if he/she does not clean it up, and give the user 7 a deadline before which to finish cleaning up. This will be a function of the admin tools and the database scheme. Moreover, the inbox can handle the sending of receipts of storage if the message is thus marked.

Figure 14:
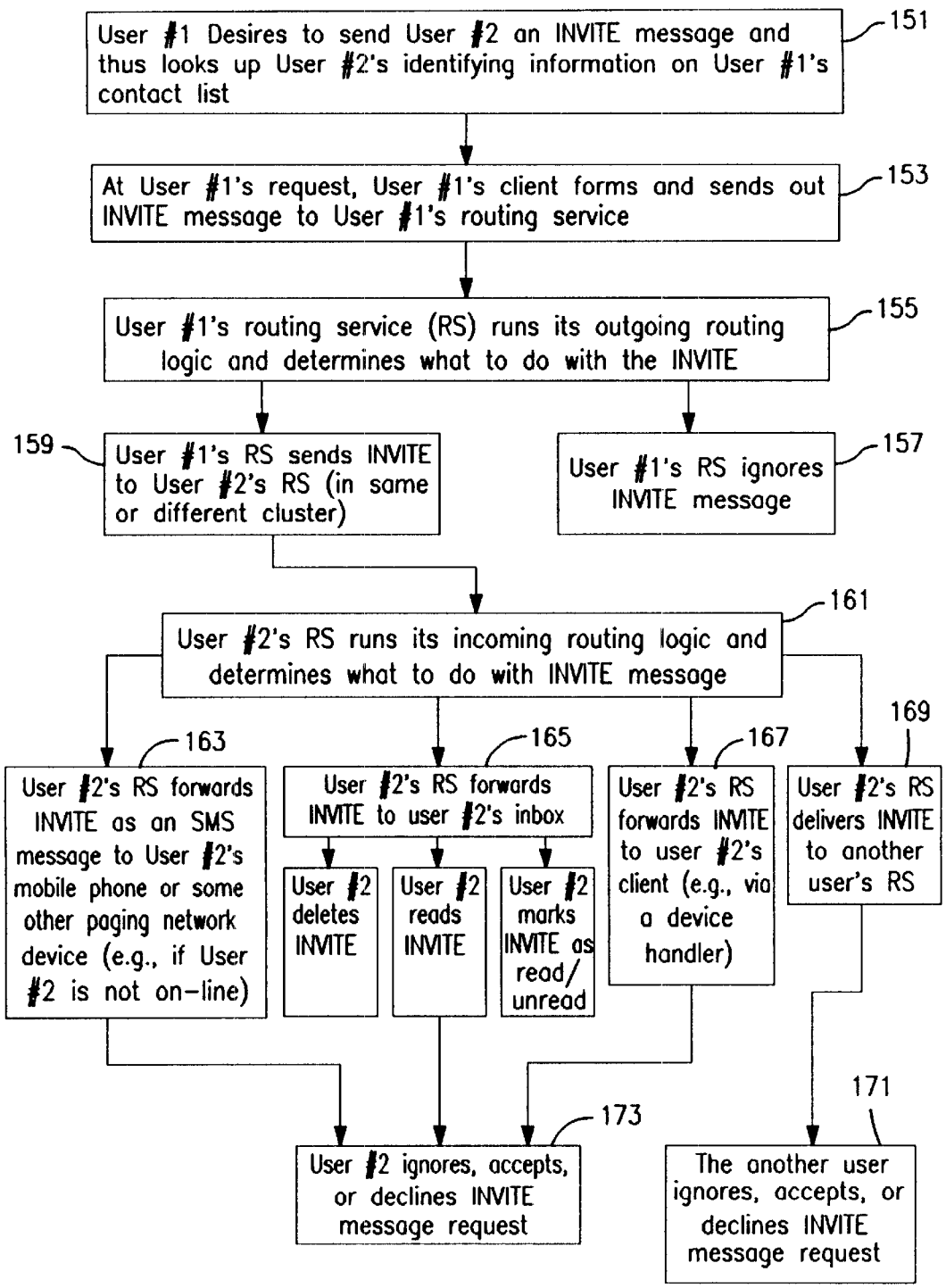
FIG. 14 is a flowchart illustrating steps taken when a user sends an invitation message to another user according to an embodiment of this invention.

FIG. 14 is a flowchart illustrating how a first user (e.g., user #1) can establish a communications session (e.g., voice chat, text chat, etc.) with a second user (e.g., user #2) using one or more clusters of the network. The first and second users may be assigned to the same cluster or alternatively to different clusters of the network. Moreover, the first and second users may be assigned to the same user server (US) 19, but more likely are assigned to different users servers 19. To start, the first user desires to send the second user an invitation message regarding the session (i.e., an INVITE message) [step 151]. The first user may look up the second user's UID on the first user's contact list (note that the UID need not include a network address of the second user such as the second user's phone number of IP address, thereby keeping a degree of anonymity associated with the communication session). At the first user's request, the first user's client (e.g., PC or phone) forms and sends the INVITE message to the first user's US 19 and to the first user's RS 33 at that US [step 153]. The first user's RS 33 on the first user's US runs its outgoing routing logic and determines what to do with the message [step 155]. The RS may, for example, ignore the message [step 157], but more likely decides to forward it to the second user's RS 33 at the second user's US 19 (at the same or a different cluster) [step 159]. The second user's RS 33 receives the INVITE message and runs its incoming routing logic as programmed by the second user, to determine what to do with the INVITE message [step 161]. For example, the routing log of the second user's RS 33 may cause the RS to: 1) forward the INVITE message as an SMS message to the second user's mobile phone or some other paging network device like a pager (e.g., if the second user is not currently online) [step 163], 2) forward the INVITE message to the second user's inbox [step 165], 3) forward the INVITE message directly to the second user's currently online client (e.g., PC) [step 167], and/or 4) deliver the INVITE message to another user's RS 33 [step 169]. In the case of 4), the another user may ignore, decline or accept the invitation [step 171]. Otherwise, the second user may ignore, decline or accept the invitation of the INVITE message as discussed herein [step 173].

Apart from sending pages, a function of the routing service 33 is to act as a tool with which users can rendezvous in any kind of session, be it e.g. a telephone call, a text chat, a video conference, or the like. To illustrate how rendezvousing works, it is best to take a few examples: one where both users are sitting at their computer, another where one user is at her computer and another is using his/her phone, and a third where both users are at their phones. Note that in none of these cases does the calling party need to know any identifying information about the called party except the called party's identifier (both the UID and system/network phone number). In fact, the calling party will never be able to find out the called party's contact information through the system/network unless the called party has specifically allowed this.

Figure 15:
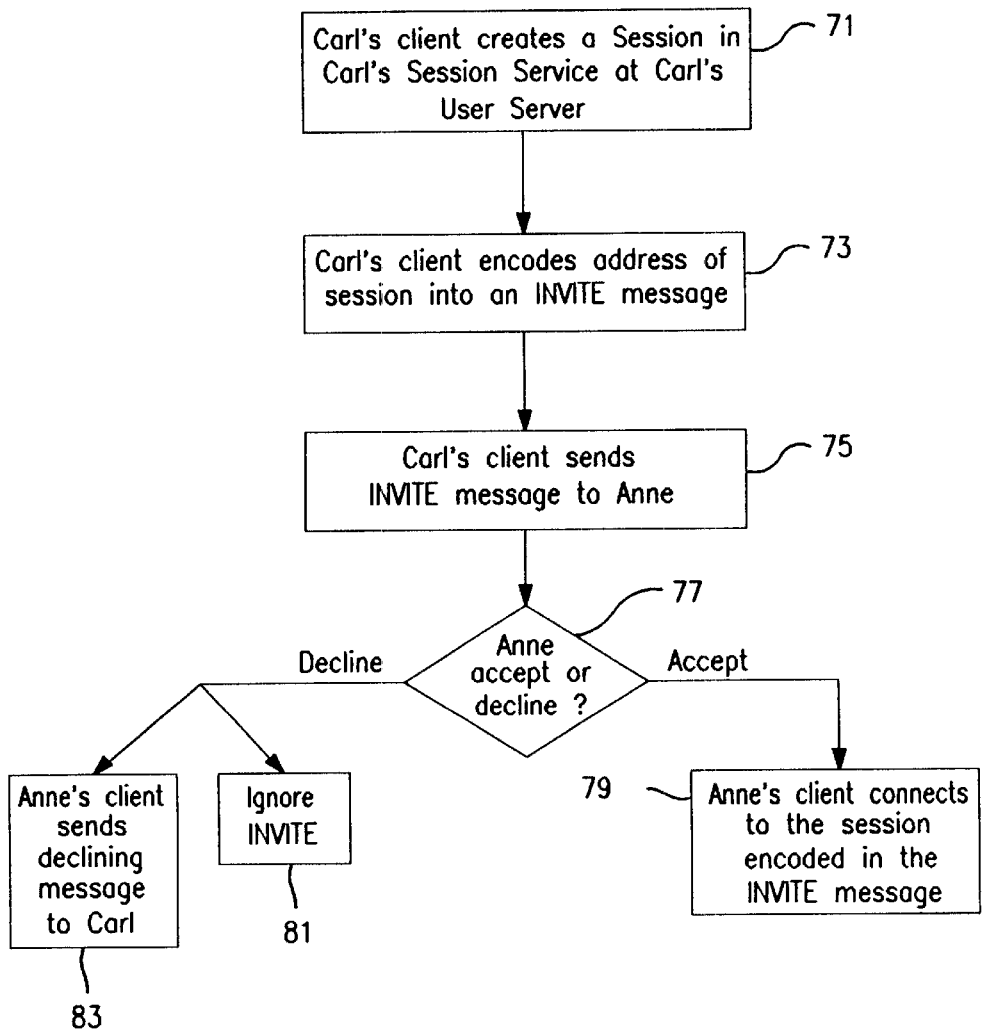
FIG. 15 is a flowchart illustrating steps taken when a user (e.g., Carl) sets up a chat session with at least one other client (e.g., Anne), according to an embodiment of this invention.

For a PC to PC rendezvous, for example, with reference to FIG. 15 imagine that Carl wants to ask Anne and William to join him in a text chat conference. Carl would start by using his client 11 to invite Anne. Carl's client 11 would start by creating a session in Carl's Session service (running on Carl's US 19) [step 71], then it would encode the address of the session (e.g., carl@phonecompany.com, session name) into an SIP INVITE message [step 73] and send that to Anne [step 75]. The INVITE message would be directed by Carl's RS 33 and Anne's RS 33 in accordance with how the respective user's had programmed their respective RSs. In the normal case, if Anne was on-line the INVITE message would be directed to Anne's client (e.g., Anne's PC). Anne then determines whether to accept of decline the invitation [step 77]. If Anne decides to accept the invitation, this would cause her client 11 to connect to the session encoded in the INVITE message [step 79]. If Anne decides to decline, she may either ignore the INVITE message [step 81] or may send a declining message to Carl's client [step 83]. To invite William, Carl would use his client to add him to the session. William would receive an INVITE, accept it in a similar manner, and join the session.

For purposes of another example, consider a PC to phone rendezvous (e.g., see FIG. 4). Carl (user A) is at his computer (e.g., PC) and wants to voice chat with Anne (user B). Carl chooses this option in his client 11, which then sends an SIP INVITE message to Anne as discussed above. Anne, however, is not at her computer (i.e., Anne's client 11 is not online). Upon receiving the message, Anne's routing service 33 notes that she is off-line but that she has asked that voice chats from Carl be forwarded to her GSM phone. Thus, Anne's RS 33 sends the message along with the phone number to call to a device handler 10 specifically created to handle this kind of INVITE message. The device handler 10 sets up a call leg to Anne in an external voice gateway 12 that it is affiliated with, sets up a temporary number in the gateway that will connect Carl to the call leg already set up to Anne if he calls it, then sends back a reply to the SIP INVITE message that tells Carl's client 11 that Anne is temporarily moved to the temporary number just set up. Carl's client 11 calls the number (using some IP telephony system), hears a ring, and then Anne answers to complete the rendezvous.

As another example, consider a phone to PC rendezvous. Assume Anne wants to use her GSM phone (i.e., Anne's client) to call William. She dials his phone number (this kind of double mapping is necessary since the phone system only supports phone numbers as addresses, not system/network UIDs). A voice gateway receives any call setup request to this number, including Anne's call setup request. It contacts a device handler which it is affiliated with and asks it where to route the call. The device handler sends an SIP INVITE message to William via William's US server and RS 33. William accepts the incoming voice chat, which causes his client (i.e., William's PC) to send back an "accepted" response to the SIP INVITE containing the phone number, his client is registered for the rendezvous in the IP telephony system he is using. William's routing logic in his RS 33 routes the message back to the very same device handler which sent the original SIP INVITE. Upon receiving the message, the device handler sends the telephone number from the message back to the voice gateway, which forwards the call accordingly to William. William's client pops up an "incoming call" dialogue which William decides to answer.

As yet another example, consider a phone to phone rendezvous. Assume that William wants to call Carl. He picks up his phone (William's client) and dials Carl's phone number. This case is the same as the Phone to PC Rendezvous case above except that Carl's routing logic in his RS 33 notes that he is offline, and thus per Carl's instructions/programming sends the INVITE message and the phone number he has specified for when he is offline to a device handler which replies to the INVITE with a "temporarily moved" message, which makes it back to the device handler which originated the INVITE, then back to the voice gateway which forwards the call to the specified number.

As discussed above, services that facilitate things like knowing the online status of other users, setting your (if you are a user 7) online status, and storing your contacts in a hierarchical list are also available. These services are provided by the following components: Online status service 31 and online status service proxy 51; Contact status service 53; and Contact list service 43.

Figure 16:
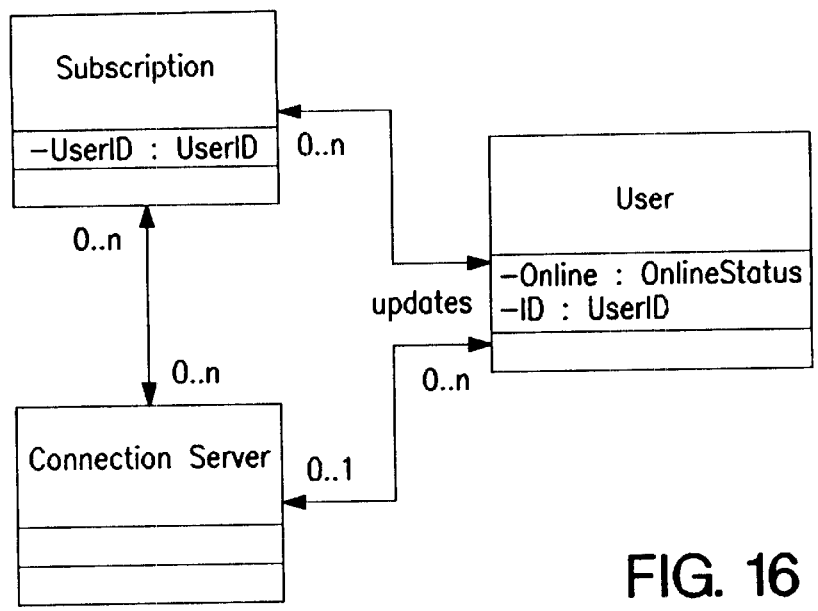
FIG. 16 illustrates exemplary data structure(s) on a user server, via the user service, according to an embodiment of this invention.

FIG. 16 shows data structures that are kept on each user server (US) 19 by the user service. This is only a rough sketch that shows the most important data elements.

Figure 17:
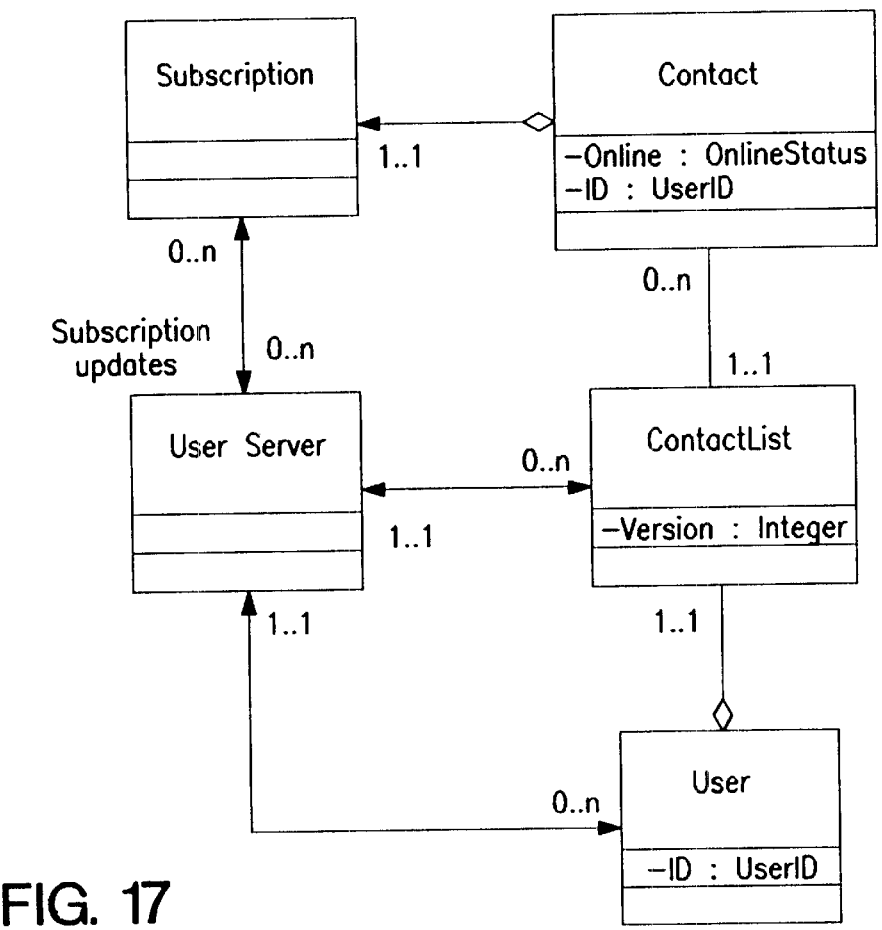
FIG. 17 illustrates exemplary data structure(s) for the contact status service on an exemplary connection server according to an embodiment of this invention.

FIG. 17 shows the data structures for the contact status service on each connection server in the same manner. Both of these data structures can be considered volatile and are kept in memory for efficiency reasons. The user's online status is subscribed from the responsible US 19 by CS(s) 21 that are watching the user as someone's contact. The CS that is connected to the user's client can update the user's online status (through the user service/user service proxy), and his/her contact list. When a US 19 gets a contact list request on a user that hasn't been loaded it loads the user data from the database. The user data is kept loaded while any CS 21 is using it. When all CSs have released the data, it can be unloaded from memory. The data may be kept in a cache of some sort for a while from where it can be quickly loaded. The version attributes of the lists serve the purpose of being able to know when to update the cache in a CS by checking the version number of the data stored on the CS and comparing it to the version number of the data stored on a US.

Figure 18A:
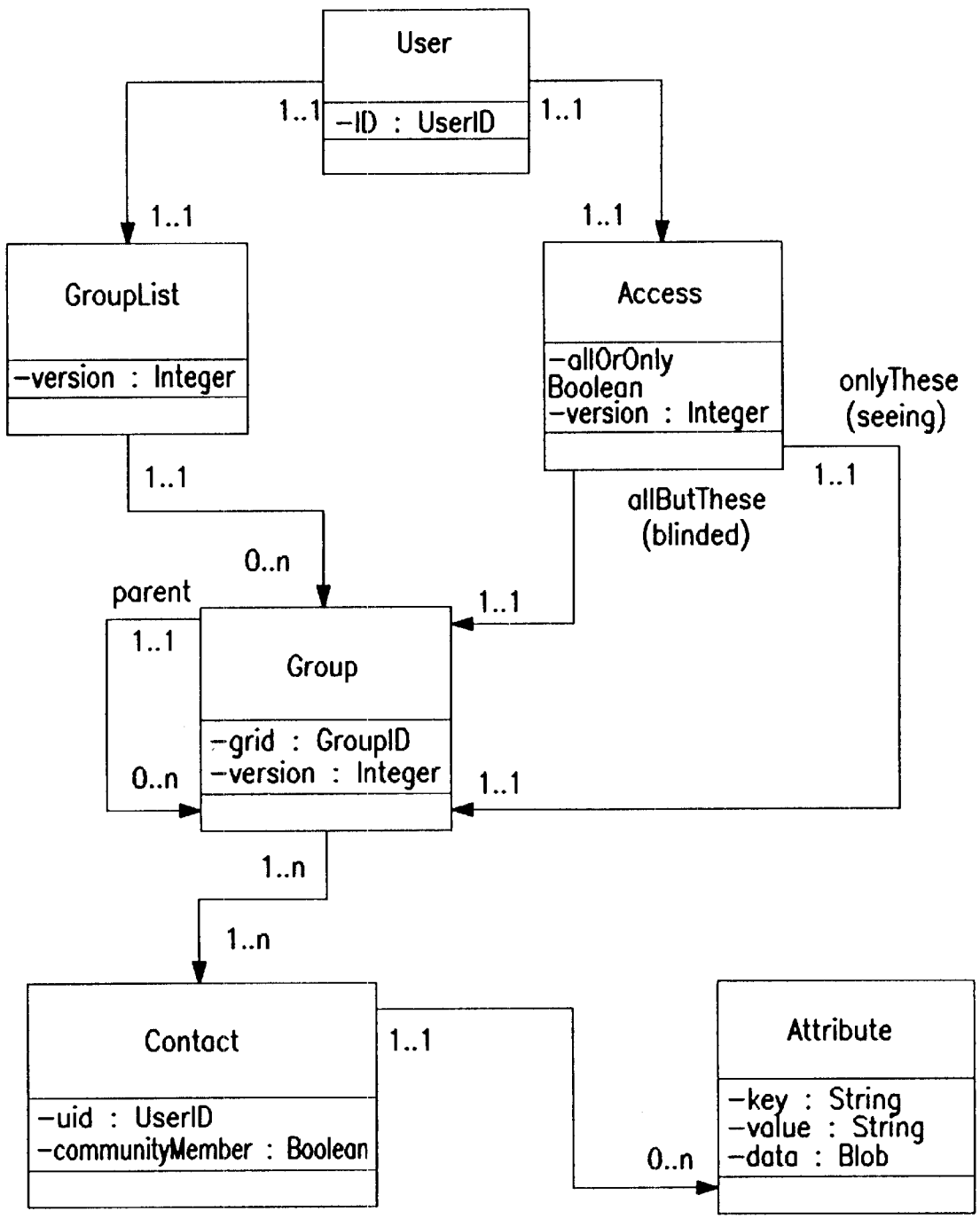
FIG. 18a illustrates a data structure(s) stored for the contact list service, which may be stored in the database and retrieved on demand, according to an embodiment of this invention.

In the contact status service 53 on a CS 21, each connected user has a contact list. The contact status service subscribes to the online status of each contact that it is watching from a corresponding user service on a US. It is the user service's responsibility to filter out blinded users when sending status updates. FIG. 18a shows the data structure stored for the contact list service 43. This information is stored in the database 13 and retrieved on demand. Each user has one blinded list and one seeing list, one of which is active at a time. If the blinded list is active, all users except those in the blinded list can see this user's online status. If on the other hand the seeing list is active, only users on the seeing list can see this user's online status.

Figure 19:
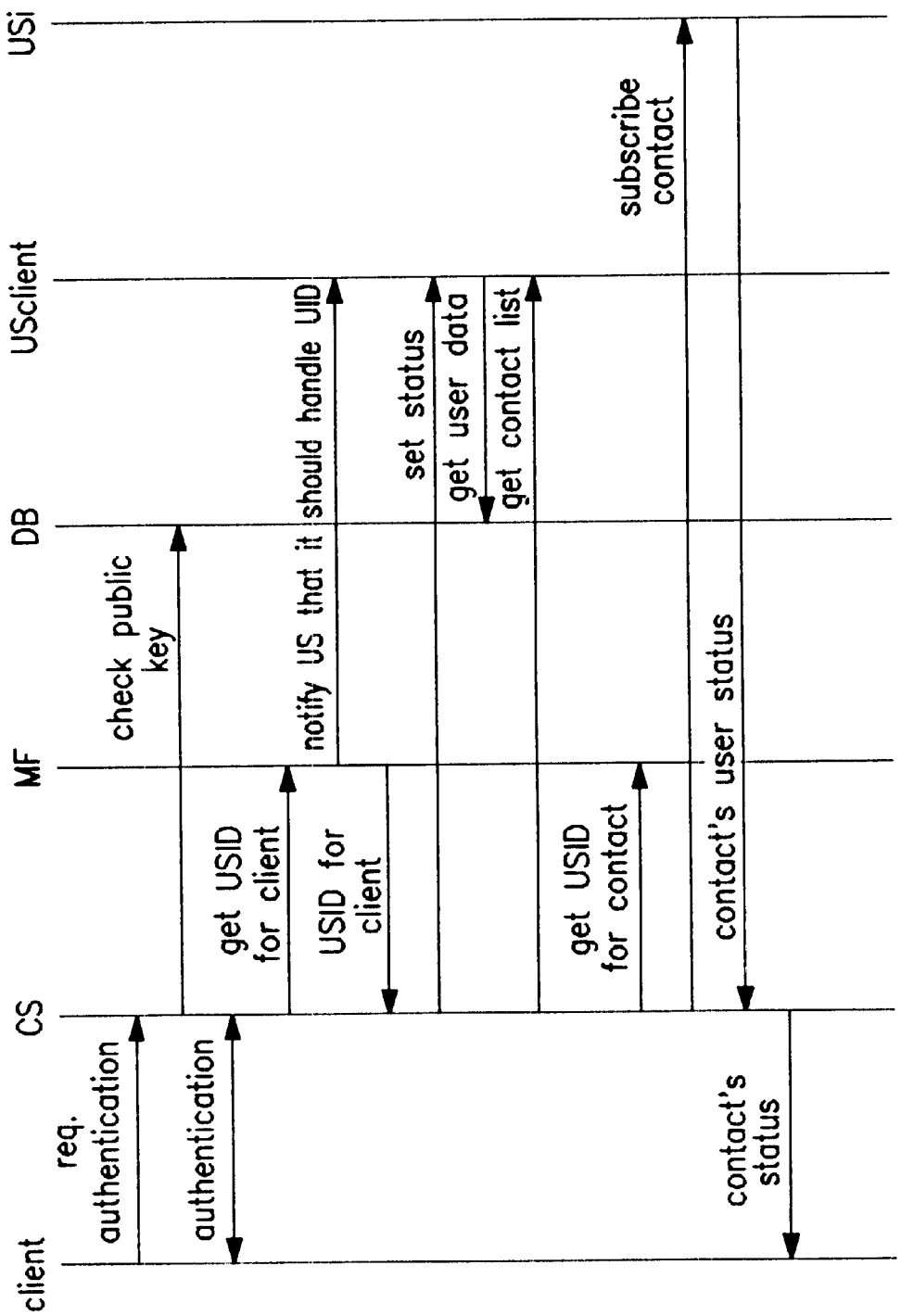
FIG. 19 is a schematic diagram illustrating a logon procedure or sequence for a user (or the user's client) according to an embodiment of this invention.

Referring to FIG. 19, in order to access the system/network of this invention, a user 7 must first log on. FIG. 19 illustrates an example of the message sequence when a user $U_1$ logs onto the system. When the CS 21 receives the authentication request it first checks the password for validity. The user may have been unregistered, etc. Then authentication is performed. In the example, the user's UID hasn't been used before.

The CS must therefore ask the UMF for USID. The UMF 25 selects an available US 19 with the least load to be responsible for that UID. The CS now sets the online status for $U_1$ on the responsible US 19 and retrieves the contact list. In the example $U_1$ has one contact, namely $B_1$. The status for that contact must be fetched from the corresponding US of that contact. After that, CS subscribes to $B_1$'s online status. The US 19 of the contact user $B_1$ only replies if $B_1$ is online. CSs and clients assume by default that a contact is off-line until they receive a status message.

Figure 20:
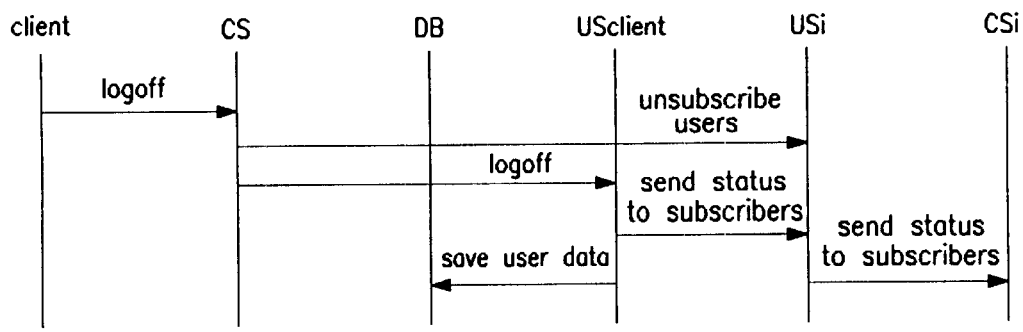
FIG. 20 is a schematic diagram illustrating a logoff procedure or sequence for a user (or the user's client) according to an embodiment of this invention.

FIG. 20 shows an example of the message sequence when a user $U_1$ logs off the backend. Now the CS 21 sends a logoff message to the US 19 responsible for $U_1$. The US sends status message to all subscribers, saves the user data and unloads it.

Figure 21:
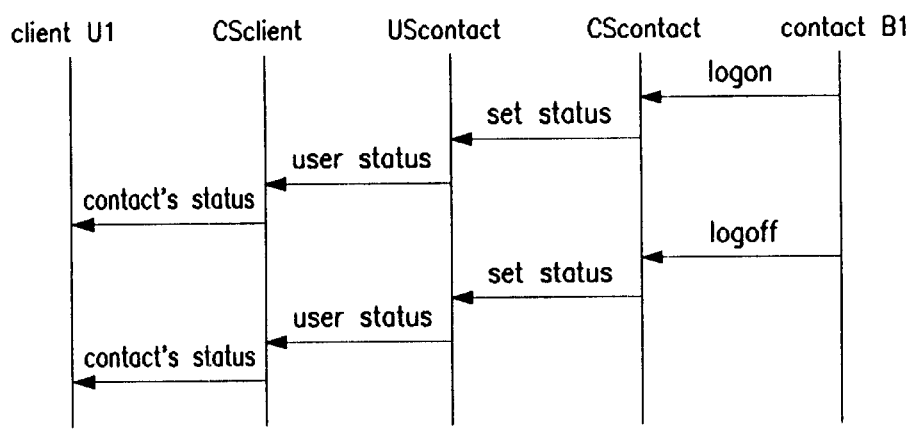
FIG. 21 is a schematic diagram illustrating a contact B1's logon/logoff procedure or sequence according to an embodiment of this invention, wherein a user or a user's client can be monitoring the contact B1 and knows when the contact comes online and when the contact goes logs off.

FIG. 21 shows an example of the message sequence when a contact $B_1$ logs on and off. The user $U_1$ is watching $B_1$ via user $U_1$'s contact status service. When the contact user $B_1$ comes online, the US of user $B_1$ sends $B_1$'s online status to all CSs 21 subscribed. In such a manner, a user can monitor the status of different contact users B throughout the system/network, without the contact users B knowing that their status is being monitored.

Figure 22:
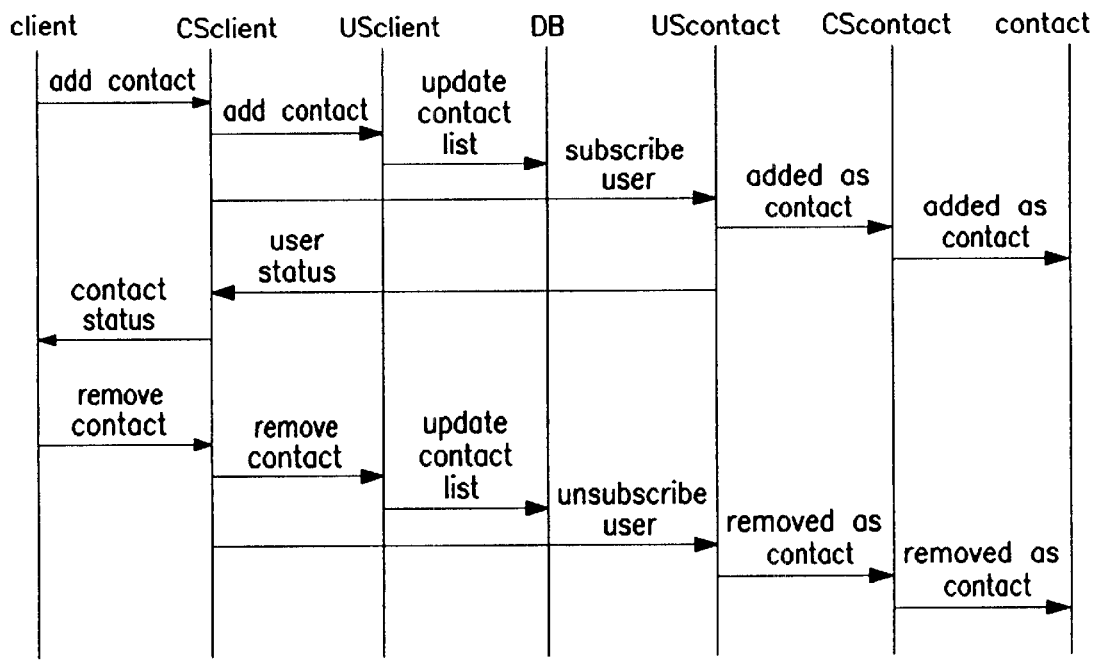
FIG. 22 is a schematic diagram illustrating steps taken during a user's or client's procedure of adding/removing a contact to/from the user's contact list.

FIG. 22 shows an example of the message sequence when a user 7 adds a contact to his/her contact list and then removes it again. It is the US's responsibility to keep the contact list updated in the database 13. When a user is added or removed as a contact on another user's contact list, the user who has been added to another user's contact list receives notification in certain embodiments, as shown in FIG. 22. One user 7 may add other users who are or are not assigned the same cluster to the adding user's contact list.

Figure 23:
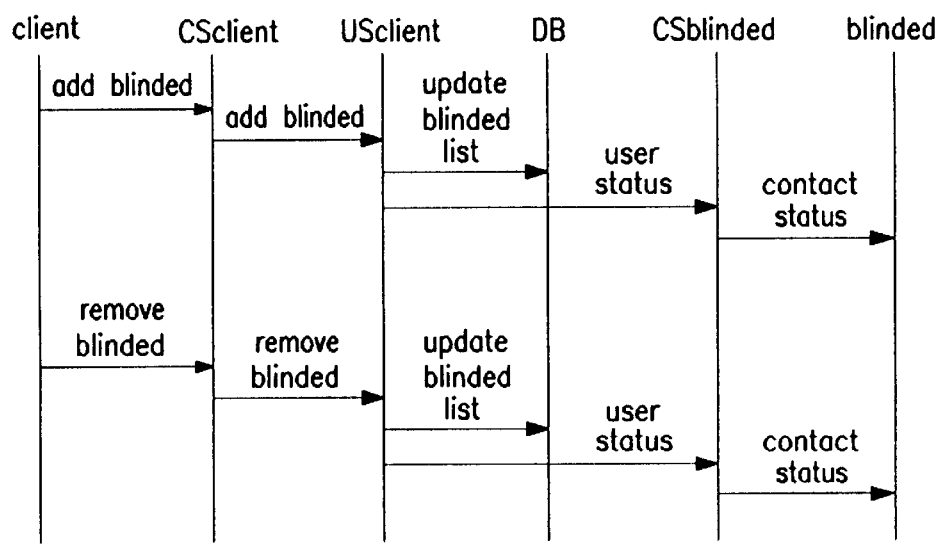
FIG. 23 is a schematic diagram illustrating steps taken during a user's or client's procedure of adding/removing another user to/from the user's blinder list.
Figures 24, 25:
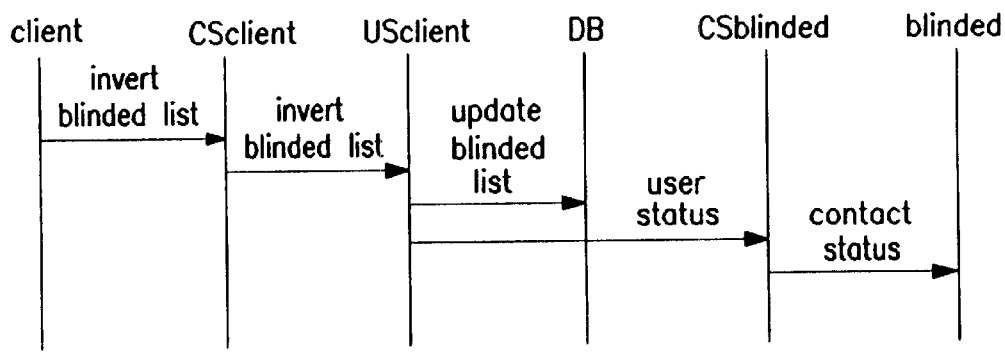
FIG. 24 is a schematic diagram illustrating steps taken (i.e., a message sequence) when a user inverts his/her blinded user list according to an embodiment of this invention (the sequence is similar to the one when a user is added to a blinded list).
FIG. 25 is a chart illustrating a summation of database operations (e.g., queries to the database) for contact list functionality according to an embodiment of this invention.

FIG. 23 above shows an example of the message sequence when a user adds another user of the system/network to his or her blinded list and then removes it again. It is the US's responsibility (i.e., the responsibility of the US 19 of the adding user 7) to keep the blinded list updated in the database 13, in certain embodiments. Note that when a user A adds user B to his blinded list, user B does not get any notification that this was done. The idea is that user B should not know he or she is on user A's blinded list. FIG. 24 shows an example of the message sequence when a user inverts his or her blinded user list. This sequence is similar to the one when a user is added to a blinded list.

Set forth in FIG. 25 is a summation of database 13 operations needed for the contact list functionality. As can be seen, in preferred embodiments, the user server of a given user 7 is responsible for most actions relating to contact list functionality of that particular user.

The session service 37 handles session management. The user that initiates a session (i.e. creates a conference or initiates file transfer) owns the session. Other users 7 get invitations to the session which contain directions on how to connect to the session. The owner of the session can invite other users (through the normal message routing mechanism), kick users out of the group, mute users so that they become observers, and/or end the session which causes all users to exit the session. Entry into a session is by invitation only; and this is preferably handled by the session management server keeping a list of users that may enter the conference. The owner of the session adds to this list when he or she invites other users.

Figure 18B:
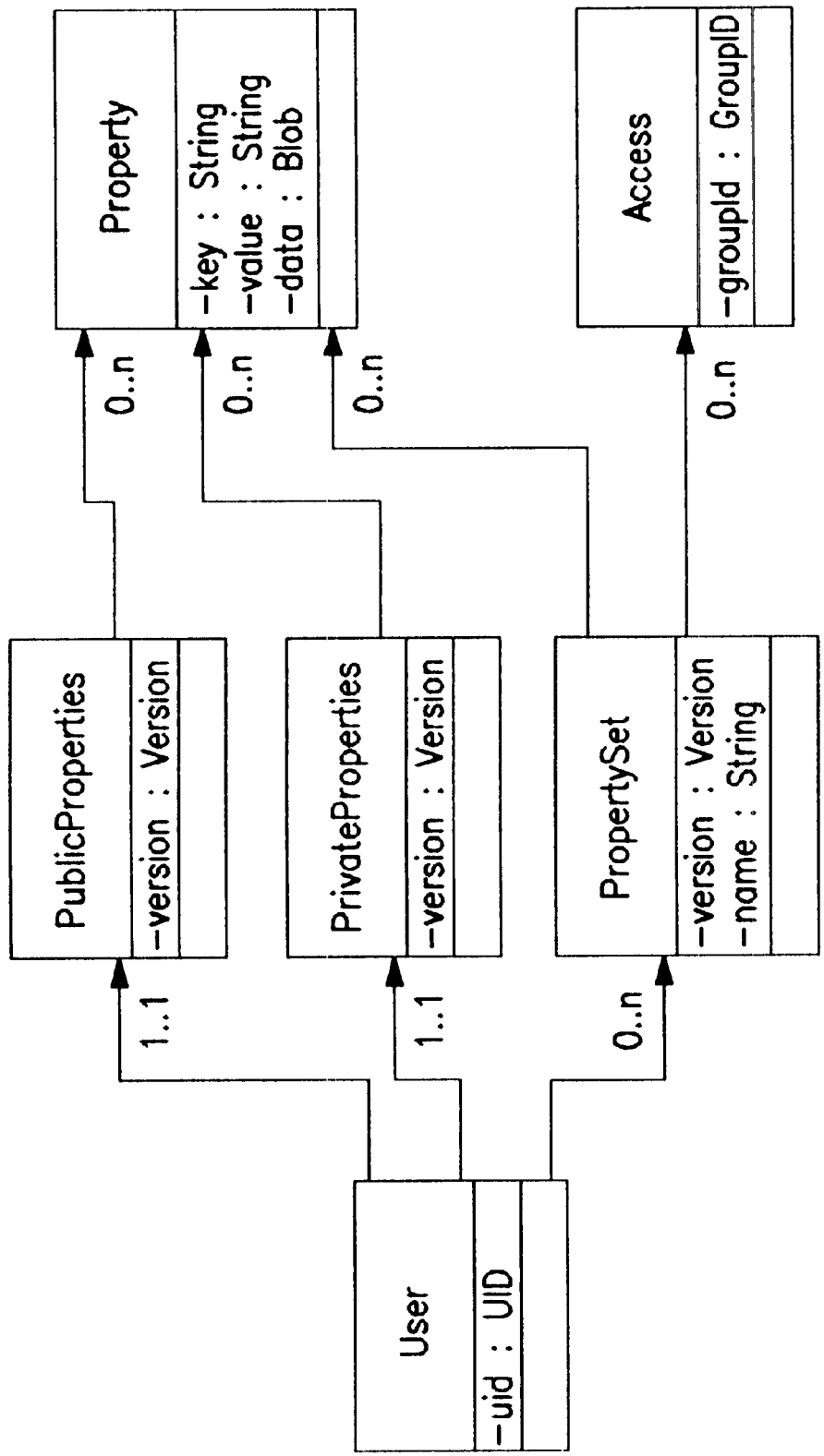
FIG. 18b illustrates a data structure for user profiles according to an embodiment of this invention.

For every user 7, a certain set of data is stored. The data is kept in key/value pairs call properties. These can be global for everyone to see, private only accessible for the user himself or it can be access controlled. FIG. 18b illustrates a data structure for a user profile according to an embodiment of this invention. The user property service 39 of a given user controls functionality and storage in this regard. Moreover, a "find user" service may be provided in certain embodiments, for enabling clients to find user IDs of other local cluster users by searching on their user properties (same properties as in the user property service 39).

For each cluster, there will be a single scaleable, robust, relational database 13 which contains all of the data the system uses which must be persistent. For smaller setups, this may be a single computer running a database such as Oracle or Informix. For larger setups where there is a very large number of users and a greater stability requirement, a cluster of high-performance computers reading from and writing to the same database will be used, and the database may, for example, reside on a mirrored, hot-swappable RAID setup. In this way, any level of redundancy can be achieved as well as the ability to deal with practically any number of users, without losing the option of running a small, cheap setup. The database 13 preferably contains the profile information kept for each user. The database will also contain the contact list and blinded list for each user. The contact list is a hierarchy of groups where a user can be part of more than one group, and a group contains all of the users it contains and recursively all of the users in groups it contains. Also stored in the database are the data for the different routing profiles for each user, along with data which describes which profile is currently active, etc. Each user's Inbox is preferably stored in the database. This is a list of messages along with information on whether they are read or unread, ordered by time of storage. Also stored is a transaction history for the messages. Possible transactions include ADDED, DELETED, DESTROYED, MARKED READ and MARKED UNREAD. The DELETED and DESTROYED transactions are equivalent as regards the server system (i.e. they delete the message from the database) but are kept as two separate transactions for increased flexibility in the client (e.g. the client could use DELETED when it wants to delete a message both from its local cache and from the server, and DESTROYED when it wants to delete the message only from the server; the different transactions will allow other instances of the client to provide the same end-user experience). Moreover, all settings for back-end servers are stored in the database in certain embodiments, as are logs from the system, both logs for administrative purposes and logs for billing purposes. All settings for each user's client are also stored in the database in certain embodiments, except for settings that have to do with the client's location, e.g. firewall settings.

Turning to scalability, let us define a mathematical model for use in determining scalability. Reference is made to Table 4 below.

TABLE 4

Symbols defined to use in the mathematical model

| SYMBOL | DEFINITION |
| --- | --- |
| A | Set of all users. |
| N | $\|A\|$, i.e. total number of users |
| n | Number of online users. |
| B(u) | Contact list for user u. It is given that $B(u) \subseteq A$ |
| L(u) | Blinded list for u. All users but users in L(u) can see u's online status. $L(u) \subseteq A$ |
| P(u) | Users privileged to see u's online status. Only users in P(u) are allowed to see u's online status. $P(u) \subseteq A$. (Either P(u) or L(u) are empty) |
| $N_{CS}$ | Number of connections servers. |
| $N_{US}$ | Number of user servers. |
| $N_R$ | Number or user regions. The user space is divided into $N_R$ regions. Each region has $N/N_R$ users. |
| f | Average number of contacts in any given contact list. Assumed to be a constant. |
| l | Average number of users in any given blinded list. Assumed to be a constant. |

What influence N and n have on how much load the routing service causes on USs (CSs do not participate in routing) may be of interest. We assume the following for simplification: 1) Online users are equally distributed on all CSs. The number of connected users on each CS is $n/N_{CS}$; 2) The work required to decide the routing for a single message based on the routing logic, $\lambda$; 3) The work required to send a message to its destination, once the route for it has been determined, is a constant, $\mu$; and 4) The number of messages that need to be routed per user per time unit is a constant, $\Omega$. Given these assumptions, the routing service causes load on each US which is of the order $$O\left(\frac{n}{N_{CS}}(\lambda+\mu)\cdot\Omega\right)$$

Since $(\lambda+\mu)\cdot\Omega$ is constant, we can keep the load caused by the service on each US constant as n increases by increasing $N_{CS}$.

With regard to connection servers 21, what influence N and n have on the load induced by the contact list service on each CS may be of interest. We assume the following for simplification:

Online users are equally distributed on all CSs. The number of connected users on each CS is $n/N_{CS}$.

All contact lists are of size $f$.

The number of events from clients per user per time unit is a constant.

Such events include: logging on, logging off, changing user status, adding users to B(u), removing users from B(u), etc. As a consequence the number of subscription messages from USs per subscribed contact per time unit is also constant.

Following our last assumption, we assume that the load on a given CS caused by events from a single connected client is constant, denoted by $\alpha$. Additionally, we assume that the load on a given CS caused by subscription events from a single contact, is constant, denoted by $\beta$.

The connected users on each CS do not have any mutual contacts with other connected users on the same CS. Further, no connected user has a contact that is connected to the same CS. This is the worst case, usually connected users share some contacts, i.e. some two connected users x and y will be interested in following the online status of the same contact Z—users x and y share the contact z. Given this, any CS has to subscribe to $f \cdot n/N_{CS}$ users.

Hereby we can see that the load caused by the service on any CS, given these assumptions, is of the order $$O\left(\frac{n}{N_{CS}}\alpha+\frac{n}{N_{CS}}f\beta\right)=O\left(\frac{n}{N_{CS}}(\alpha+f\beta)\right)$$

As $\alpha+f\beta$ is constant, it is clear that by adding more CSs to the network as n grows, the load on each CS can be kept constant. Hence, the CS part of the network is scalable.

Most likely some contact sharing will occur on each CS, decreasing its load. However, the contact sharing will decline as N grows. This is clear because connected users can have contacts from anywhere in the user space A, and the chance that any two users share their $f$ contacts decreases as A grows. Experience shows that in systems like the instant invention, users will group in cliques. In a clique, each user will have nearly all the others in each of the other users' contact list. (Note that the mathematical definition of a clique is stronger. In a mathematical clique, each user would have all the other users in its contact list.) The chance of contact sharing may be increased if users are connected to CSs in such a way that they are likely to be in a clique with some other connected user on that CS. The likelihood may for example probably be increased by connecting users to CSs by their geographical position.

Similar to the previous section on connection servers, what influence N and n have on the load caused by the contact list service on each US 19 may be of interest. We assume the following:

Online users and users that are on an online user's contact list, are equally distributed on all USs. The number of users on each US is $n/N_{US}$.

All contact lists are of size $f$.

The number of events from CSs per user per time unit is a constant. As a consequence the number of updates to subscriptions that need to be sent to CSs per user per time unit is also constant.

The load on a given US caused by events from a single online client is constant, denoted by $\theta$. The load caused by subscription updates on a single user that need to be sent to a single CS is constant, denoted by $\omega$.

The network is large enough such that $N_{US} >= f$. No contact sharing occurs in the CSs. Thus, subscription updates for a single user have to be sent to $f$ USs. This is the worst case.

The load the service puts on any US, given these assumptions, is of the order $$O\left(\frac{n}{N_{US}}\theta+\frac{n}{N_{US}}f\omega\right)=O\left(\frac{n}{N_{US}}(\theta+f\omega)\right)$$

As with the connection servers, by adding more US to the network as n grows, the load on each US can be kept constant. Hence, the US part of the network is scalable.

As for reliability issues, a cluster 1 is an asynchronous, distributed system including the following discrete components: 1) Connection Servers; 2) User Servers; 3) User Mapping function; 4) Database; 5) Internal Network; 6) External Network; 7) Clients; 8) Intra-cluster servers. We assume that the Internal Network and the Database implement their own redundancy and achieve close to 100% uptime. To meet its reliability requirements the Community Server Network therefore has to be able to deal with the following types of errors: 1) client failure; detected by CS, affects only the client that failed; 2) External Network failure, loss off connectivity with one or more clients; detected by connection servers 21 and clients, corrected by throwing away the Session State on the server side and establishing a new connection from the client; 3) Connection Server failure, a hardware or software failure that leads to the loss of a CS; detected by connected clients, and corrected by clients by reconnecting; 4) User Server failure, a hardware or software failure that leads to the loss of a User Server; detected by connected CSs and/or the UMF, and corrected by removing all mappings to the afflicted US from the UMF and broadcasting a request to all CSs that they selectively flush their UMF cache (affected CSs then throw away any session state associated with the lost US 19 and reconnect to other, newly assigned USs), 5) Intra cluster server failure; same case as US failure; 6) User mapping function failure; detected by Uss 19, and corrected by the USs restarting the UMF 25.

With regard to logging, auditing and/or traceability, all relevant events in the system may be logged to the database 13. These fall into two main categories: events that are of interest to the administrator, and events that can be used for billing. For each event, the date and time of the event are stored, as well as which user was responsible for the event. Each event has a type, and may possibly have some additional data attached to it. When logging a request made through the client to server protocol by a user to a CS, the IP address of the user might be stored as well. Administrators may use special administration tools or simple SQL queries to do administrative tasks such as see which user accounts have unsuccessfully attempted to authenticate themselves more than once or twice in a row (to detect hacking attempts), count the number of users who were logged in at a certain time or over the whole day, or to see which events took place just before and at the time the system crashed (to try to gain an understanding of the reason for the crash). Community operators can use whatever means they like to gather data from the server for billing purposes.

With regard to security and user authentication, every registered user 7 has an assigned user ID in the local cluster 1 in certain embodiments of this invention. As part of the registration process, the user selects a password for accessing his account. The user presents his/her user ID and password to the cluster 1 each time he/she connects. As for server authentication, each CS 21 is supplied with a public/private key pair. The public key of the pair is certified by some Certificate Authority (CA). Each time a client connects to a CS, it gets a copy of the server's public key and the associated certificate. The client can verify the authenticity of the public key by checking the certificate, and by verifying with the CA that the certificate has not been revoked. After receiving the server's public key and verifying its authenticity, the client authenticates the server by a cryptographic challenge-response, in a similar fashion as for user authentication.

With regard to communications security and client-server communications, in certain embodiments of this invention all communications between a client and the CS are secure. The SSH 2.0 protocol is used in all clients-server communications. SSH 2.0 handles server authentication, client authentication, data integrity validation and data encryption. The client connects to distinct services on the server cluster the by means of opening multiple SSH channels, each of which is separate virtual stream. As for server-server communications, the network that handles communications between User Servers 19, the UMF 25 and Connection Servers 21, is assumed secure and protected from unauthorized access. Neither authentication nor encryption is performed in communications between USs in certain embodiments of this invention, the UMF and CSs. Communications between CSs 21 and Uss 19 may use the SSH 2.0 protocol. erver authentication, user authentication, data integrity validation and data encryption are disabled for such connections, so only the stream multiplexing facility of SSH need be used. Communications between Community Operators are preferably encrypted, and public key cryptography used to authenticate both ends. The SSH 2.0 protocol may be used for such communications, and mutual server authentication performed by means of public/private cryptography and key certificates. With regard to physical security, hardware, including hosts running the database 13, CSs 21, Uss 19, the UMF 25, network routers, bridges, network wiring and any other parts of a cluster 1, needs to be physically secured from unauthorized access and tampering by the Community Operator. The security of the entire system collapses if part of a cluster is physically compromised, since any part of the cluster may contain or carry sensitive information, such as CS's private keys, user's private information and communications etc. More Moreover, it is noted that Connection Servers lie on the boundary between the unsecured Internet and the secure Intranet that hosts the cluster 1. Connection Servers may see all connected clients' traffic in cleartext, and also contain their own private keys in cleartext. Because Connection Servers are open to connections from the unsecured Internet and handle all client communications, they will function as firewalls of sort. Each CS 21 has two network interfaces, one to the unsecured Internet and one to the secure intranet. There is no routing performed between the two networks. In certain embodiments, Connection Servers are able to log every connection and connection attempt. Log entries include such information as the date and time of day of the connection attempt, source IP number, user ID used for any authentication attempts and the reason for authentication failure. For successful connections, Connection Servers additionally log the time of disconnection and the amount of data transferred in each direction. In certain embodiments, it is preferred that the Community Operator filters and audits traffic from the Internet destined for the Connection Servers to prevent hacking and to keep track of any hacking attempts.

Figure 26:
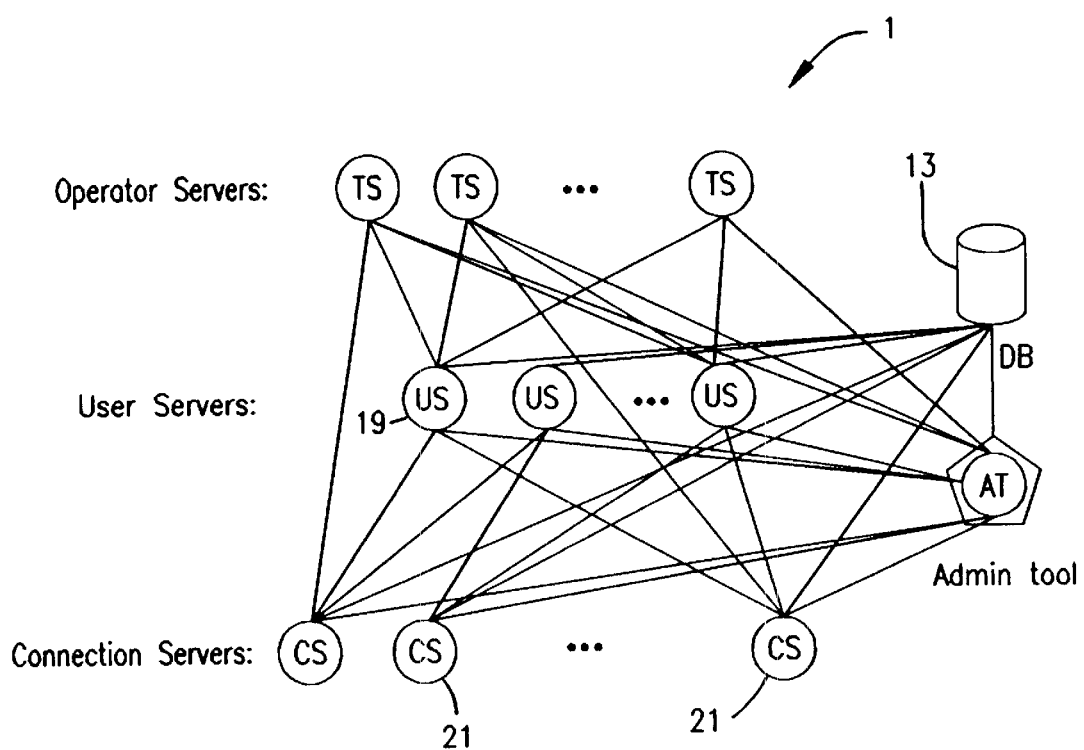
FIG. 26 illustrates the position and/or functionality of an administration tool/service according to an embodiment of this invention.

Settings for each component of the back-end are preferably stored in the DB, from where the component reads them upon startup. These settings are preferably configurable from the admin tool, which has a connection to each back-end component and notifies it of changes in settings as is necessary. FIG. 26 illustrates the admin tool's location in a cluster 1. Adding users to the application and removing users from it is handled by a separate admin tool which basically issues a new UID, then writes the user's information into the database. It shall be possible to run this administration tool from the command line, for use with CGI programs etc.

As can be seen from the above, a user 7 is able to create new profiles, delete profiles, edit profiles etc. and he shall be able to set which profile is currently active. Smart routing is based on the user's currently active profile and basically means that whenever another specific user tries to contact the user using a specific mode of communication that user will be routed to a conversation endpoint or message repository which can handle that mode of communication. Based on settings in the profile, the other user could be routed to an auto-replier which responds that the user doesn't like him and doesn't want his calls, or be put through to the user's GSM etc.

These modes of communication/conversation types shall be available: text, voice, and video. These message types shall be available: Voice (VM), Short text message (STM), Email (EM), Notification (sent to notify of the delivery of messages other than STMs) (NM). The following devices may be supported. We list which types of messages they are repositories for, which types of conversations they can take part in, and which types of messages they can send.

TABLE 5

| Device | Repository for these message types | Endpoint for these conversation types | Can send messages of these types |
|---|---|---|---|
| Inbox | STM, NM | | |
| client | | Text, Voice | STM |
| Standard phone | | Voice | |
| GSM phone | STM, NM | Voice | |
| Auto-replier | | Text, Voice | |
| Web page | | | STM |
| Pager | STM, NM | | |
| Email client | STM, EM | | STM, EM |
| Voice mailbox | VM | | |
| Fax machine | STM, EM | | |

It shall be possible to create additional devices as needed (e.g., conversational agent). As for the devices above, the auto-replier device is basically a device which the user 7 can set up to reply differently to different users, using voice and/or text. This device is an integral part of the instant system/network. In the case of voice conversations, only the client 11 is able to initiate a voice conference between more than two users. The inbox receives all STMs sent to a user, as well as notifications of delivery of messages (e.g., when the system routes an email to the user's fax). The user can specify which types of message deliveries he wants notification of. The client can give access to the inbox, and notify the user of new messages arriving in the inbox. In the case that user A tries to contact user B using a mode of communication or message type that user B does not support (i.e., user B has no device capable of participating in the mode of communication or receiving the message type) the system shall notify user A of this.

As for text conferences, such conferences can handle tens of users per conference. The user who initiates the conference preferably has ownership rights in the conference, which gives that user the ability to invite users to the conference, kick users from the conference and make users silent. With regard to voice conferences, such conferences can preferably handle no less than the number of users that the MCU or equivalent that the application depends on can handle. The user 7 who initiates the conference preferably has ownership rights in the conference, which gives him/her the ability to invite users to the conference, kick users from the conference and make users silent. As for web conferencing, this is the name given to the feature of the user 7 being able to join a text conference or a voice conference with all of the other users browsing the same web page as him/her. In web conferences, no user has ownership rights. Web conference groups have a maximum size of X users (which can be set by administrators of the application). If there are more than this many users viewing the same web page, they will be split into groups of no more than X users. The user interface for web conferences may make it easy for users to create their own text, voice or video conference and to invite users to this conference. It shall also make it easy for the user to see which of the other users in the conference have the capability to join a voice conference or a video conference.

With regard to voice mail integration, a user 7 can enumerate the contents of his/her voice mailbox through the application (i.e., see how many messages there are, when they arrived etc.) and administer his/her voice mailbox (i.e., delete messages, etc.). A user 7 can also to any of the messages in his/her mailbox using the application. A user 7 can also send messages using his/her standard email program, from the application (e.g., by clicking on a contact's e-mail address). It may be possible for the user to get notification of when he has new email (check every X minutes). If there is new email, the user can easily be able to make the system/network open his/her email program to read the messages. Apart from this functionality, the application may forward different message types to the user's e-mail box. The user can have an email address which is specific to the system/network of this invention, this being done so that the system/network can route email, and also for anonymity.

The system/network of this invention is preferably designed to be accessible via many different clients/users. The functionality of the application back-end can be accessible from any client (although bridging work may be required). Several clients fall within the scope of the application. The "full client" features text and voice capabilities, and is a standard GUI program with a persistent connection to the server. This type of client is the one we are usually referring to when we say "a user shall be able to do X", i.e., this type of client is the one that allows the user to do X. Other clients are either stripped down versions of this one, or very limited clients. The "thin client" is a stripped down version of the full client which lacks one or more of its features (e.g., audio chat). The "web client" is a very basic client to the application which enables users with nothing more than access to a forms-enabled browser to send anyone in the community a page. There is no requirement of being able to receive pages via the web etc. The web client may optionally also enable the user to switch the profile currently being used. Optionally, the web client may enable users to view the contents of their inbox and read received messages. The "phone client" is a client which allows the user to phone a given number (á la voice mail) and switch the profile currently being used.

There can be, e.g., two categories of users that access the application. For paying customers (i.e., telco end users) the requirement is made that no matter where they log on to the application, the user experience is identical (i.e., no data is stored at the client side). This requirement is not made for Internet end users.

Back-end administration can be manageable at least through command-line tools or equivalent and optionally through user-interface tools. How registration of users is handled may be decided on a per-telco basis; in one case it might be through the explicit entering of data and running of administration tools by a telco employee, in another it might be through a CGI script or equivalent running the administration tools with data gathered directly from the user.

One aspect on the back-end regarding administration is the logging of information. It may be possible to log every detail regarding the operation of the system which might be pertinent to the operator. Which details are logged shall be configurable via an administration tool. It shall be possible to easily import log data from the system into other software packages for analysis and archiving.

In certain embodiments of this invention, as many parts of the system as possible may have well-defined interfaces to the rest of the system and be as self-contained as possible, thus facilitating a plug-in methodology in the implementation of the system. This is so the implementation of the various parts of, for example, telephony integration, can be split among several separate groups. It is also made for future compatibility with as-of-now unrelated systems, e.g., the conversational agent technology.

The application can provide users with a single, centralized address book which stores user information on every user in the community. This address book can store, e.g., each user's full name and email, community name, and user ID. It may optionally store other things such as interests, home page URL, telephone numbers and such. The community name and email can be public information. For the rest of the information, the user can define which users are allowed to view it and which not, by specifying groups or inverses of groups along with users and combining these with boolean operators. Users do not have to be able to browse the address book (i.e., page through it) in all embodiments. They can however be able to find users in the address book based on searches for whole strings or part of strings in the name, email and community name fields. Also, it may be possible to find a user based on the whole of his user ID. If many users in the address book fit the search pattern, the user who initiated the search shall be presented with all of these and asked to choose between them based on as much additional information on each user as can be given. For example, once user Snooglepops has found user Muffin in the address book, Snooglepops can add Muffin to his personal buddy list (i.e., contact list) and also can send Muffin a page without adding him/her to the buddy list, as well as being able to request that Muffin join a conference.

The buddy list (a.k.a. contact list) is a set of users. These users can be organized into a hierarchy of groups by the user. Users may occupy more than one group. The user can create and destroy groups, and add users to or remove them from groups, as well as being able to move or copy users between groups and move groups from one place in the hierarchy to another. Groups are containers for users and groups. The following groups exist by default:

TABLE 6

| | |
|---|---|
| Everybody | This group is composed of all users that belong to the same community, whether they are currently on-line or not. This group is not visible in the user interface, but can be used when specifying access to data. |
| Buddies | This is the sum of all your buddies, the root of the buddy list hierarchy. |
| Invisible | This is a special group which the user can add annoying users to. Users in this group shall not, be able to see the user's online status, (this may be done by always showing them that the user is off-line) and no messages from users in this group ever reach the user (although to the annoying user sending the message nothing will indicate that the message was not received). This group is not part of the buddy list hierarchy but in a separate hierarchy |
| Frequent contacts | This is a group composed of the X last users the user sent pages or initiated conferences with, where X is a user-settable preference. This group cannot be used for access control. |

A user can have the option of getting a notification whenever another user adds him/her to the other user's buddy/contact list. Moreover, by glancing at the buddy list, the user can see the online status of his/her buddies. The buddy list can provide visual notification of changes in the online status of buddies, as well as providing an optional user-settable audio notification. The user can view the information stored in the global address book for any user in his/her buddy list.

As for paging, a user can send short text messages (STM) to any user on his/her buddy list and to any user that he/she finds using the address book. Whether or not these messages are seen by the receiving user depends on the recipient's online status and on whether or not he has made himself invisible to the sending user. The default way of receiving messages is through the client. Apart from this, users can specify a GSM phone number capable of receiving SMS messages that may be used in either of the following ways (user-settable): 1) The user may specify that all messages that would have been let through to the client by the user's RS 33 be forwarded to the GSM phone. 2) The user may specify that all messages that arrive while the user is away from his/her terminal or off-line be forwarded to the GSM phone.

There may be a maximum size for short text messages, or short text messages may be truncated when forwarded to a GSM phone through SMS. Which is done is a design decision. When sending a short text message, whether replying to a message sent by another user or not, the user can select one of his/her pre-configured stock messages to use as the body of the message. When the user is paged by a user that is not part of his/her buddy list, it may be possible for the paged user to add the paging user to his/her buddy list and also to reply to this message easily without adding him to his/her buddy list. When a user is paged, there can be an easy means for that user to invite the sender of the page to a text or voice conference. In certain embodiments, messages may be denoted urgent. In certain embodiments, it may be possible for a user to choose multiple recipients for a message, based on groups of users and individual users. The total number of users that it is possible to send a message to can be limited to prevent use of this feature for spamming.

There can be two different user interfaces for initiating conversations or sending messages to another user, one for inexperienced users and one for experienced users. The one for inexperienced users may take more time to operate but can be easier to use with more helpful descriptions of actions and more pictures etc. to help the user along.

The user's client preferably can display a list of all past outgoing and incoming messages, along with at what date and time they were sent, to/from whom, and what the contents were. The user shall be able to delete messages from this log to save space. The user shall be able to limit the messages displayed by one of two criteria, or a combination of both: whether they were outgoing or incoming, and to/from which user they were. Also, it may be possible to display only actual messages (no notifications).

Short text messages (STMs) sent to a user's inbox can be readable directly from the Inbox. In the case of notification messages which notify of the delivery of a message to some message repository, it may be possible for the user to ask for the application to retrieve the message. The application can then check the message repository for whether the message still exists, and retrieve the message if possible. This can be possible in some cases for voicemail and email, but not for fax messages.

A user can set up an assortment of stock messages ("I'm away", "I'm busy", etc.). An automatic reply is when one of these stock messages is used automatically by the application on behalf of the user. Every user can have an online status which defines whether or not that user can be reached and which auto-reply is used when another user pages him/her (possibly no auto-reply is used and the user is free to answer for himself). For this version of the application, there can be a fixed set of online statuses for a user to choose between, as in Chart 7 below:

| Chart 7 | |
|---|---|
| Online and available | All messages (except for messages from users you are invisible to) get through. |
| Online but occupied | Only urgent messages get through immediately, others are auto-replied with a stock message the user can choose and will be shown to the user when he changes to the "online and available" mode. |
| Online but away from terminal | Messages do not get through immediately. The user may choose an auto-reply for messages sent to him while in this mode. |
| Off-line, not available | Same as previous. |

The user may specify users or groups of users that can get through to him/her even if his online status is do not disturb. Any of the groups defined in the buddy list, or the inverse (i.e., all users not in the group) of those groups, may be used to specify this. There can be one generic ready-made stock reply for each online status available. There can also be one ready-made stock reply for each online status which indicates that the message has been forwarded or duplicated to the user's GSM phone through SMS. The user can choose whether or not to let senders of messages know that their message was routed to his/her GSM phone. No requirement is made of being able to answer messages using SMS, or of being able to send a message from an SMS system to a user.

With regard to text conferencing, a user 7 can send any user on his/her buddy list or any user that he/she finds using the address book a request to join a text chat conference hosted by the originating user. The request may be accompanied by the user's explanation of why it is made. When receiving a request to join a chat conference, the receiving user can choose to join the conference or not to join the conference, or can choose to ignore the request (this is what happens when you are invisible to a user, and that user invites you to a conference). The user's response may be accompanied by his reason for responding as he/she does. Once a conference has started, the originating user has special privileges within the conference, and can invite additional users to the conference (may be accompanied by an explanation), kick users from the conference (may be accompanied by an explanation), and/or give or take away the right to speak in the conference. All users in the conference can use text to chat, and the conference shall display a history of the messages sent by the different users (e.g., IRC etc.). All users can also emote (as in IRC) their feelings in an easy way, i.e., to let other users know they're smiling. Text conferences may be able to handle at least 20–30 users. When the user with special privileges quits the conference, the conference is preferably disbanded in certain embodiments.

In voice conferencing embodiments, a voice conference is a text conference with the added ability to chat using voice. When multiple users speak at once, their separate inputs are mixed together to form the output. Audio quality may be dependent on the codec used and possibly on the bandwidth available. It is presumed but not a requirement that the GSM codec will be used. Only users who have the capability to receive and send voice signals can participate in a voice conference.

As for video conferencing between users 7, a video conference is a voice conference with the added ability to see the user who is currently speaking loudest. Only users who have the capability to receive and send voice and video signals can participate in a video conference. Another option can be the implementation of Web Conferencing between users 7.

The application is aimed at users who have access to the Internet and an account with a telephone company, and have received their application from the telephone company. These users are anything from novices to veterans who wish to use the Internet for communication. The application is also aimed at users who have access to the Internet and have received their application over the Internet (not through a telephone company). These users are anything from novices to veterans who wish to use the Internet for communication.

In practice, community operators are the technical people at a telephone company. They can be expected to use command-line tools to administer the system, set up supporting gateways and servers, etc. and are trained in doing this kind of job.

In certain embodiments, end user requirements for a client of a user 7 may be as allows:

28.8 baud modem connection, higher bandwidth for voice depending on codec
  Windows 95 or newer, Windows NT or newer, Windows CE or MacOS operating system
  16 Mb of memory (4 Mb for Windows CE version)

The back-end software can run on Windows NT and several of the mainstream Unix operating systems (at least Solaris). It can scale well as more money is thrown at the server machines (number/speed of processors, amount of memory, amount of bandwidth, speed of I/O).

In certain embodiments, the client-side application can work through a SOCKS firewall without the system administrator needing to do any special setup, and through other firewalls by having the system administrator open a very limited number of ports. The client-side application may be a small application. We assume that the installation program for a feature-rich (although not necessarily full-featured) version may fit on a standard floppy disk (1.44 Mb). The application can have a markedly fast startup time, and its UI can be responsive under all circumstances.

The overall robustness of the client-side application may be comparable to other end-user software. Specifically, it may: 1) Notify the user of any error messages that are relevant to him in plain language. Offer the user to try to reconnect automatically in cases of a lost connection; 2) Notify the user when the application's back-end software has been updated, and point the user to a place to download the new version of the client software; and/or 3) the client software can automatically download and install new versions of itself when it is connecting and finds that the application's back-end has been updated.

Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. A server network for enabling respective users to establish communications with other users, the network comprising:

first and second server clusters, each cluster including at least a user server for performing user services and an intra-cluster server for connecting to remote intra-cluster servers in other clusters;

said user server in said first cluster including a routing service for a first user assigned to said first cluster, and said user server in said second cluster including a routing service for a second user assigned to said second cluster;

wherein the first user sends a communication invitation message or request to the routing service of the second user in the user server in the second cluster without knowledge of the type of client then being utilized by the second user, wherein the message or request is forwarded to the routing service of the second user via said user server in said first cluster, said intra-cluster server in said first cluster, and said intra-cluster server in said second cluster; and wherein said routing service for the second user in the user server of said second cluster routes the invitation message or request to a client of the second user based on local routing logic for the second user.

2. The network of claim 1, wherein the client of the second user comprises one of a personal computer (PC), a mobile phone, and a pager.

3. The network of claim 1, wherein each cluster further comprises at least one connection server for connecting the cluster to respective clients of respective users, and each cluster further comprises a database from which user servers may access user information.

4. The network of claim 3, wherein each cluster includes a plurality of user servers, a plurality of intra-cluster servers, and a plurality of connection servers.

5. The network of claim 1, wherein in each cluster said user server performs routing services for respective users and enables respective users to monitor online statuses of other selected users in the network.

6. The network of claim 1, wherein the first user is registered with the first cluster and given a unique user identification (UID) that includes a cluster identifier identifying only the first cluster, such that the UID of the first user constitutes a globally unique ID within the network; and wherein the second user is registered with the second cluster and given a unique user identification (UID) that includes a cluster identifier identifying only the second cluster, such that the UID of the second user constitutes a globally unique ID within the network.

7. The network of claim 1, wherein, when the first user is using a personal computer (PC) as a client, the first and second clusters enable the first user and second user to communicate with one another in each of the follow manners: 1) text chat using PC to PC communication, 2) voice chat using PC to PSTN phone communication, and 3) voice chat using PC to mobile phone communication.

8. The network of claim 7, wherein, when the first user is using a personal computer (PC) as a client, the first and second clusters enable the first user and second user to communicate with one another in each of the additional follow manners: 4) pages using PC to PC communication, 5) pages using PC to SMS communication, and 6) web conference.

9. The network of claim 1, wherein routing logic of the routing service of the second user is based upon preferences of the second user and/or a type of message sent thereto.

10. The network of claim 1, wherein messages are not sent directly between users but instead via routing services thereof so that the first user does not know which client the second user is using, the routing service of the second user determining whether to ignore the invitation message or forward it to the client of the second user.

11. The network of claim 1, wherein routing logic of the second user is transparent to the first user even though what client the second user is using is not known to the first user.

12. A method of creating a communication session between first and second users in at least one server cluster, the method comprising the steps of:

a client of the first user creating a communication session in a user server of the first user;

the client of the first user encoding an address of the session into an invitation message;

the client of the first user sending the invitation message to a user server of the second user, through at least one intermediate server;

a routing service of the second user on the user server of the second user determining whether to ignore the message or forward the invitation message to a client of the second user, so that messages are not sent directly between users but instead via routing services thereof whereby the first user does not know which client the second user is using;

the client of the second user accepting the invitation message and connecting to the communication session.

13. The method of claim 12, wherein each of the user server of the first user, the user server of the second user, and the at least one intermediate server are all within a first cluster of servers, and wherein each of the first and second users are assigned user identifiers (UIDs) which include a cluster identifier therein.

14. The method of claim 12, wherein the communication can be each of PC to PC, PC to PSTN phone, and PC to mobile phone, depending upon the client currently being used by the second user, and the first user need not know the type of client currently being used by the second user at the time the invitation message is sent.

15. The method of claim 12, wherein said step of the client of the first user sending the invitation message to a user server of the second user, through at least one intermediate server, does not require that the first user or the at least one intermediate server know a network address of the second user, so that communications can be set up between the first and second users while maintaining a significant degree of anonymity.

16. A method of establishing a communication session between first and second users, the method comprising the steps of:

providing at least one server cluster, and providing a user server for the first user, and a user server for the second user;

a client of the first user sending an invitation message regarding the communication session to the user server for the second user via a connection server;

the user server for the second user determining whether to forward the invitation message to a PC of the second user or a mobile phone of the second user depending upon an online status of the PC of the second user, and the user server for the second user forwarding the invitation message to one of the PC and the mobile phone accordingly;

the second user receiving the invitation message via the second the PC or mobile phone and accepting the invitation; and wherein messages are not sent directly between users but instead via routing services thereof so that the first user does not know which client the second user is using, the routing service of the second user determining whether to ignore the invitation message or forward it to a selected client of the second user.

17. A network comprising:

a first cluster and a second cluster;

each of the first and second clusters including a plurality of user servers in communication with a database, at least one connection server for connecting to external user clients, and at least one intra-cluster server for communicating with other clusters of the network; and wherein the clusters enable a first user connected to the first cluster to establish a communication session with a second user of the second cluster without the first user knowing an IP address or phone number of the second user.

18. The network of claim 17, wherein the first user can send an invitation message regarding the session to the second user by utilizing a network user identifier (UID) of the second user that includes a cluster identifier.

19. The network of claim 17, when the clusters and the network enable the communication session between the first and second users to be each of: 1) text chat using PC to PC communication, 2) voice chat using PC to PSTN phone communication, and 3) voice chat using PC to mobile phone communication, depending upon the clients currently in use by the respective users.

20. A network enabling a communication session between first and second users in at least one server cluster, the network comprising:

a client of the first user for creating a communication session in a user server of the first user;

the client of the first user for encoding an address of the session into an invitation message;

the client of the first user sending the invitation message to a user server of the second user, through at least one intermediate server;

a routing service of the second user on the user server of the second user determining whether to ignore the message or forward the invitation message to a client of the second user, so that messages are not sent directly between users but instead via routing services thereof whereby the first user does not know which client the second user is using; and the client of the second user accepting the invitation message and connecting to the communication session.

* * * * *